United States Patent [19]
Yokomizo et al.

[11] Patent Number: 5,907,835
[45] Date of Patent: May 25, 1999

[54] ELECTRONIC FILING SYSTEM USING DIFFERENT APPLICATION PROGRAM FOR PROCESSING DRAWING COMMANDS FOR PRINTING

[75] Inventors: Yoshikazu Yokomizo, Yokohama; Susumu Sugiura, Atsugi; Mitsumasa Sugiyama, Kawasaki, all of Japan

[73] Assignee: Canon Kabushiki Kaisha, Tokyo, Japan

[21] Appl. No.: 08/560,496

[22] Filed: Nov. 17, 1995

[30] Foreign Application Priority Data

| Nov. 18, 1994 | [JP] | Japan | 6-285260 |
| Dec. 2, 1994 | [JP] | Japan | 6-299630 |
| Dec. 5, 1994 | [JP] | Japan | 6-300445 |
| Jan. 31, 1995 | [JP] | Japan | 7-034252 |

[51] Int. Cl.$^6$ .................................................. G06F 17/30
[52] U.S. Cl. .............................................. 707/1; 707/200
[58] Field of Search ...................... 395/600, 601; 358/403, 445; 382/232, 239, 56

[56] References Cited

U.S. PATENT DOCUMENTS

| 4,797,945 | 1/1989 | Suzuki et al. | 382/56 |
| 4,885,704 | 12/1989 | Takagi et al. | 364/521 |
| 4,943,868 | 7/1990 | Yoshinaga et al. | 358/403 |
| 5,099,340 | 3/1992 | Kamada et al. | 358/403 |
| 5,187,592 | 2/1993 | Sugiyama et al. | 358/430 |
| 5,231,482 | 7/1993 | Murakami et al. | 358/75 |
| 5,251,020 | 10/1993 | Sugiyama | 358/500 |
| 5,255,104 | 10/1993 | Ogawa | 358/445 |
| 5,283,667 | 2/1994 | Kojima et al. | 358/462 |
| 5,321,831 | 6/1994 | Hirose | 707/10 |
| 5,339,169 | 8/1994 | Meguro et al. | 358/403 |
| 5,363,504 | 11/1994 | Hasuo | 395/600 |
| 5,404,479 | 4/1995 | Yamamoto | 395/425 |
| 5,422,735 | 6/1995 | Ogawa | 358/456 |
| 5,428,727 | 6/1995 | Kurosu et al. | 395/147 |
| 5,432,614 | 7/1995 | Yamamoto | 358/403 |
| 5,434,684 | 7/1995 | Sugiyama | 358/527 |
| 5,461,682 | 10/1995 | Nomura | 382/232 |
| 5,517,583 | 5/1996 | Horiuchi et al. | 382/239 |
| 5,535,013 | 7/1996 | Murata | 358/432 |
| 5,555,322 | 9/1996 | Terai et al. | 382/232 |
| 5,555,362 | 9/1996 | Yamashita et al. | 395/145 |
| 5,572,726 | 11/1996 | Hasuo | 707/200 |
| 5,581,752 | 12/1996 | Inoue et al. | 707/1 |
| 5,602,983 | 2/1997 | Naba et al. | 395/501 |
| 5,608,858 | 3/1997 | Kurosu et al. | 395/763 |
| 5,649,188 | 7/1997 | Nomura et al. | 707/100 |

*Primary Examiner*—Thomas G. Black
*Assistant Examiner*—Frantz Coby
*Attorney, Agent, or Firm*—Fitzpatrick, Cella, Harper & Scinto

[57] ABSTRACT

There is disclosed an electronic filing apparatus which allows to handle files, prepared by different application programs, as the files common to these programs in easy and inexpensive manner. The drawing information, transmitted from each application program activatable by the computer system, is converted into a predetermined print data format, defined by the operating system, by the printer driver. Then the QuickDraw-common document conversion device converts the print data, converted into the predetermined print data format, into the common document file format which can be directly referred to by the plural application programs, and the common document in thus converted common document file format is stored in the data base.

89 Claims, 35 Drawing Sheets

| CELLA1 | CELLB1 | CELLC1 | CELLD1 |
|--------|--------|--------|--------|
| CELLA2 | CELLB2 | CELLC2 | CELLD2 |
| CELLA3 | CELLB3 | CELLC3 | CELLD3 |

DETERMINED TO BE ONE GROUP

DETERMINED TO BE TWO GROUPS

FIG. 8

| ID | SIZE | MEANING |
|---|---|---|
| ID | 2 BYTES | KINDS OF CONTENTS |
| LENGTH | 2 BYTES | LENGTH OF CONTENTS (BYTES) |
| CONTENTS | VARIOUS TYPES | (DESCRIPTION OF FIGURE) |

FIG. 9

| ID | SIZE | MEANING |
|---|---|---|
| ID | 2 BYTES | KINDS OF CONTENTS |
| LENGTH | 2 BYTES | LENGTH OF CONTENTS (BYTES) |
| CONTENTS | VARIOUS TYPES | (DESCRIPTION OF SENTENCE) |

| CELLA1 (T) | CELLB1 (T) | CELLC1 (T) | CELLD1 (CR) |
| CELLA2 (T) | CELLB2 (T) | CELLC2 (T) | CELLD2 (CR) |
| CELLA3 (T) | CELLB3 (T) | CELLC3 (T) | CELLD3 |

FIG. 18

```
TD;PWXL;N;E
P;PGeneral
P;P0
P;P0.00
P;P#,##0
P;P#,##0.00
P;P#,##0;\-#,##0
P;P#,##0;;[Red]\-#,##0
P;P#,##0.00;;\-#,##0.00
P;P#,##0.00;;[Red]\-#,##0.00
P;P"\"#,##0;;"\"\-#,##0
P;P"\"#,##0;;[Red]"\"\-#,##0
P;P"\"#,##0.00;;"\"\-#,##0.00
P;P"\"#,##0.00;;[Red]"\"\-#,##0.00
P;P0%
P;P0.00%
P;P0.00E+00
P;P#\?/?
P;P#\??/??
P;Pyyyy/m/d
P;Pd\-mmm -yy
P;Pd\-mmm
P;Pmmm\-yy P;Ph:mm\AM/PM
P;Ph:mm:ss\AM/PM
P;Ph:mm
P;Ph:mm:ss
P;Pyyyy/m/d\h:mm
P;P\$#,##0_);;\(\$#,##0\)
P;P\$#,##0_);;[Red]\(\$#,##0\)
P;P\$#,##0.00_);;\(\$#,##0.00\)
P;P\$#,##0.00_);;[Red]\(\$#,##0.00\)
P;Pr/m/d
P;Pr"年"m"月"d"日"
P;Prr"年"m"月"d"日"
P;Pm/d/yy
P;Pyyyy"年"m"月"d"日"
P;Ph"時"mm"分"
P;Ph"時"mm"分"ss"秒"
P;FOsaka;M240
P;FOsaka;M240;SB
P;FOsaka;M240;SI
P;FOsaka;M240;SBI
P;FOsaka;M240
F;P0;DG0G10;SM0;M320;N16384 12
B;Y3;X4;D0 0 2 3
O;L;D;V4;K47;G100 0.001
C;Y1;X1;K"CELLA1"
C;X2;K"CELLB1"
C;X3;K"CELLC1"
C;X4;K"CELLD1"
C;Y2;X1;K"CELLA2"
C;X2;K"CELLB2"
C;X3;K"CELLC2"
C;X4;K"CELLD2"
C;Y3;X1;K"CELLA3"
C;X2;K"CELLB3"
C;X3;K"CELLC3"
C;X4;K"CELLD3"
E
```

FIG. 19

| <NAME> | <CODE> | <LENGTH> | <TYPE> |
|---|---|---|---|
| START OF PICTURE | TOP_OF_PICTURE | 0 | NONE |
| RECTANGLE OF PICTURE | PICTURE_RECT | 8 | Rect |
| STRAIGHT LINE | LINE | 8 | Point x 2 |
| SQUARE | FRAME_RECT | 8 | Rect |
| SQUARE (FILLED) | FILL_FRAME_RECT | 8 | Rect |
| CIRCLE, OVAL | FRAME_OVAL | 8 | Rect |
| CIRCLE, OVAL (FILLED) | FILL_FRAME_OVAL | 8 | Rect |
| POLYGON | FRAME_POLY | UNDEFINED | Polygon |
| POLYGON (FILLED) | FILL_FRAME_POLY | UNDEFINED | Polygon |
| OVAL SIZE | OVAL_SIZE | 4 | Point |
| PEN SIZE | PEN_SIZE | 4 | Point |
| PEN MODE | PEN_MODE | 2 | Short |
| PEN PATTERN | PEN_PAT | 8 | |
| PEN COLOR | FORE_COLOR | 4 | RGBColor |
| BACKGROUND COLOR | BACK_COLOR | 4 | RGBColor |
| END OF PICTURE | END_OF_PICTURE | 0 | NONE |

FIG. 20

| POSITION OF FIGURE | ENTIRE, TOP RIGHT, TOP LEFT, BOTTOM LEFT, BOTTOM RIGHT |
| --- | --- |
| FEATURE OF FIGURE | MANY LINES, MANY CIRCLES, MANY SQUARES, MANY OVALS, MANY POLYGONS |
| COLOR OF FIGURE | TOP 3 OF 8 STANDARD COLORS ("STANDARD COLORS" ARE OBTAINED BY CONVERTING THE MOST SIGNIFICANT 3 BITS OF RESPECTIVE RGB COMPONENTS INTO 8 COLORS IN THE TABLE LOOKUP METHOD) |

FIG. 21

| <NAME> | <CODE> | <LENGTH> | <TYPE> |
| --- | --- | --- | --- |
| START OF PICTURE | TOP_OF_PICTURE | 0 | NONE |
| RECTANGLE OF PICTURE | PICTURE_RECT | 8 | Rect |
| FONT NAME | FONT | 2 | Short |
| FONT SIZE | FONT_SIZE | 2 | Short |
| FONT STYLE | FONT_FACE | 2 | Short |
| TEXT | TEXT | UNDEFINED | |
| END OF PICTURE | END_OF_PICTURE | 0 | NONE |

ELECTRONIC FILING SYSTEM USING DIFFERENT APPLICATION PROGRAM FOR PROCESSING DRAWING COMMANDS FOR PRINTING

BACKGROUND OF THE INVENTION

1. Field of the Invention

The present invention relates to an electronic filing apparatus, an electronic filing system and an electronic filing method, for filing documents with electronic means.

2. Related Background Art

The conventional electronic filing apparatus, a large-sized expensive exclusive apparatus, is not necessarily convenient for use as it is designed with an exclusive operating method which requires a specially trained operator, and is incapable of managing the documents in common with desk top printed documents, as it is independent from the personal computer.

To realize a compact and inexpensive electronic filing apparatus, it is conceivable to apply the filing technology on a commercially available personal computer. The functional elements required for the electronic filing apparatus are a scanner, an OCR, a keyword searching function, a disk device such as a magnetooptical disk device etc. A document printed on "paper" is read by the scanner, then the character information is converted into codes by the OCR, also the key words are automatically picked up and stored in the disk device together with said codes. These functions are sufficient for an apparatus designed exclusively for electronic filing, but, in case of electronic filing on a personal computer, the documents to be handled would not be lemeted to those printed on "paper". Thus, it becomes necessary to handle desk top printed documents, prepared by entry from the keyboard. However such desk top printed (DTP) documents are completely different in file formats, depending on the application software used in their preparation. This will result in the following drawbacks if such documents are stored in the form of files:

(1) In case of access, from plural personal computers, to the DTP documents stored in a server provided on a network, the application software used in the preparation of the document may not be present on all such personal computers. Even a difference in version of such application software will present difficulty;

(2) In case personal computers of different architectures are present on the network, even files prepared by the same application software cannot be accessed mutually as they are usually different in the file format;

(3) The commercially available application softwares are not usable for electronic filing, as most lack the function of extracting the key words;

(4) If an exclusive search software is prepared and the filing operation is conducted in an indirect manner from a commercially available software through said search software, the document information is transmitted through a file or through a cut-and-paste function, but the procedure required for such an operation is cumbersome, requires a long time, and is difficult to automate;

(5) The conventional electronic filing apparatus, being independent from the personal computer, is incapable of managing the files and the DTP documents on common basis.

To resolve some of these drawbacks, various filters been provided.

The number of filters required varies according to the number of applications to be used. For example, for 10 applications, $_{10}C_2$ combinations of the filters will be required, so that there will be an enormous number of filter processes involved.

Also, the data exchange between applications of quite different character, such as a scanner application, word processing application, table calculating application is extremely difficult if it is conducted through files, because the file formats generated by such different applications are arbitrarily determined by the vendors of the software and have no mutual interchangability.

Also certain standard formats such as "TIFF", "PICT", "EPS", "GIF", "TGA" etc., not dependent on the application are not universal, being compatible only with a part of such applications.

Also, some personal computers such as MaCintosh or Windows-based machines are designed to effect data exchange through the "cut and paste" function, but with a format limited to "PICT" or "GIF".

SUMMARY OF THE INVENTION

In consideration of the foregoing, the object of the present invention is to provide an electronic filing apparatus capable of accumulating the information, to be transmitted from an application software to a printer driver, in the data base.

Other objects of the present invention, and the features thereof, will become fully apparent from the following description which is to be taken in conjunction with the attached drawings.

BRIEF DESCRIPTION OF THE DRAWINGS

FIG. 8 is a view showing the basic configuration for encoding a picture portion;

FIG. 9 is a view showing the basic configuration for encoding a text portion;

FIG. 18 is a table showing an example of SYLK format presentation of a table;

FIG. 19 is a table showing an example of code description of a picture;

FIG. 20 is a table showing an example of graphic classification;

FIG. 21 is a table showing an example of code description of a text;

DESCRIPTION OF THE PREFERRED EMBODIMENTS

First embodiment

In the following there will be explained embodiments of the present invention, with reference to the attached drawings.

Figure 1:
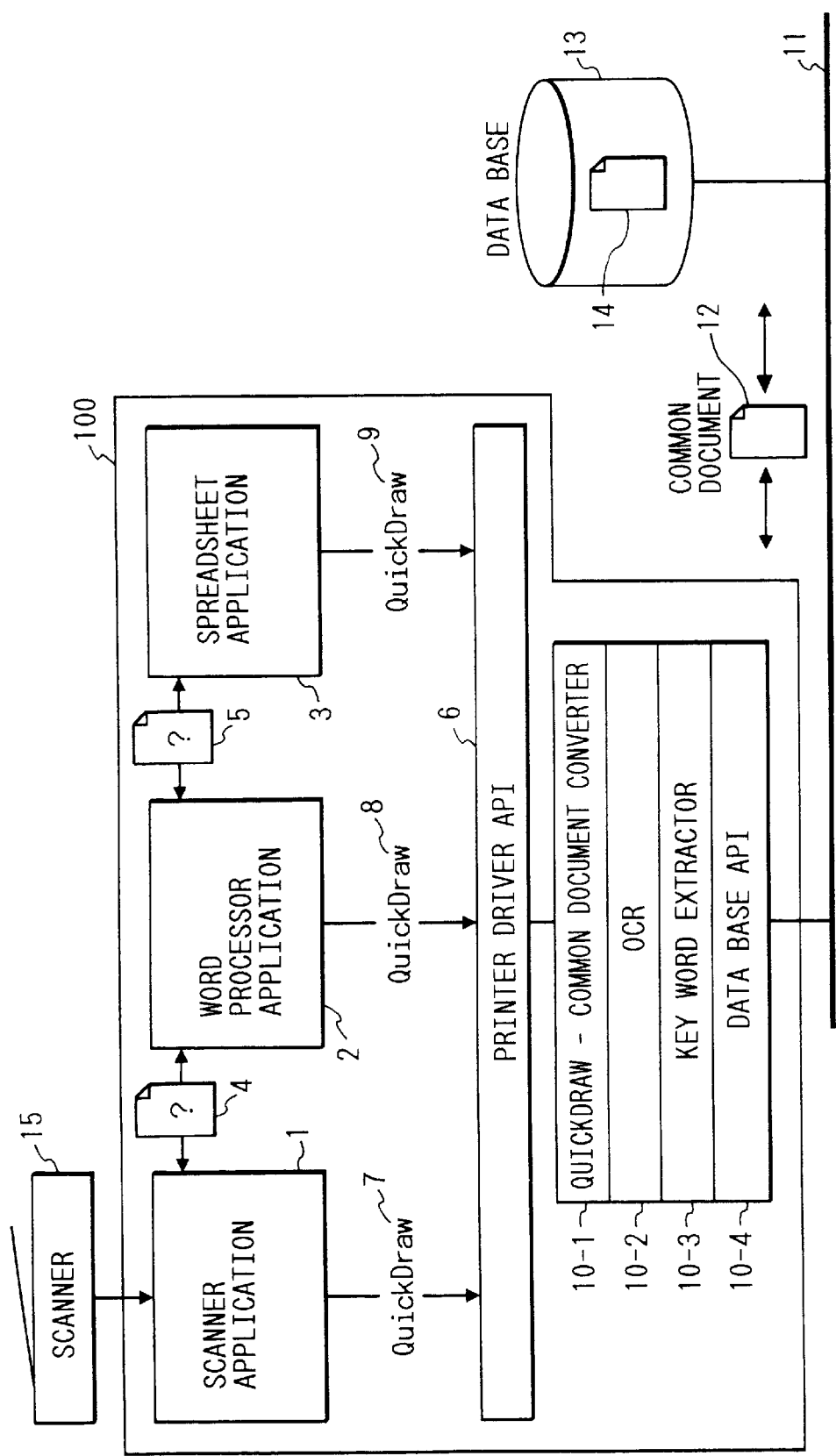
FIG. 1 is a block diagram of an electronic filing apparatus embodying the present invention.

FIG. 1 is a block diagram of an electronic filing apparatus of a first embodiment, wherein a host computer 100 executes functions shown in a frame. However, the functions in the frame may be executed by one or plural CPUs, or by one or plural host computers. In FIG. 1, the numbers 1, 2, 3 indicate commercially available applications (or application programs) such as a scanner application 1, a word processing application 2, and a table calculating application 3. Data exchange among these applications is very difficult through files 4, 5, because the formats of the files generated by the scanner application, word processing application, table calculating application, etc., are arbitrarily determined by the vendors and are not mutually interchangeable. The standard file formats independent of the application, such as "TIFF", "PICT", "EPS", "GIF", "TGA" etc. do not match all the applications.

If the computer is "MaCintosh" (registered trademark) or a "Windows"-based machine (registered trademark), there is provided a system for data exchange through the "cut and paste" function, but the format is limited to "PICT" or "GIF". Consequently, the data exchange by the "cut and paste" function is still not possible even if the computer is limited.

On the other hand, the data to be transferred to the printer driver in case of printing by these applications are limited to QuickDraw (registered trademark) in case of MaCintosh or GDI (registered trademark) in case Windows. FIG. 1 shows the mode of transfer of the print data of the applications 1, 2, 3 of MaCintosh to a printer driver 6. Except for a part of the Postscript application, most applications transfer the drawing commands 7, 8, 9 of QuickDraw to the printer driver 6. The present invention utilizes this point and handles the QuickDraw by providing the printer driver 6 with document conversion/accumulation function.

10-1 indicates a QuickDraw-common document conversion device. The drawing commands of QuickDraw are dependent on the computer and are common to most applications in MaCintosh, but are incompatible with Windows which uses GDI commands. Consequently the QuickDraw-common document conversion device 10-1 effects conversion into a general document format easily savable in the data base.

Common documents 12, 14 can be processed even if they are prepared by drawing or painting, or in a mixed manner. Drawing refers to an image drawing method with numbers designating the thickness, color and coordinate of each line and in which the receiving side has to have a function of decoding these numbers for regenerating the image. On the other hand, painting refers to a bit map image, which does not require a decoding function at the receiving side if the data size becomes larger.

An OCR device 10-2 is used in case of encoding a bit map image, but is bypassed in case of a drawn image already in an encoded state.

A keyword extraction device 10-3 extracts words usable for search, from a common document prepared by the QuickDraw-common document conversion device 10-1, for use in the access in combination with said document.

A data base API 10-4 is used for connection to a data base 13 which can be a local one or a remote one connected through a network.

The printer driver API is matched to the one provided by the system. This API allows one-directional data transfer, in the ordinary case where the printer is anticipated for printing only, and the document extracted from the data base cannot be transmitted to the applications 1, 2, 3 by inverse conversion to the QuickDraw commands. However, in the present embodiment the printer driver is formed as a general-purpose driver. The bidirectional document exchange through the printer driver requires changes in the operating system and applications, but the bidirectional document exchange is possible by an exclusive document search software.

The common document 12 is transmitted to the data base 13 through the LAN 11.

In using the apparatus shown in FIG. 1 as a document filing apparatus, an original is read by a scanner 15, under the control of the scanner application 1, but, such original read by said application is converted into the QuickDraw 7 and transmitted to the printer driver 6 in case of printing. Thus, in the QuickDraw presentation, the content scanned is a bit map image, so that it is reformed into the bit map image by the device 10-1 and is compressed, if necessary, by a compression circuit (not shown).

The printer driver 6 supports all the QuickDraw commands supported by the OS of the personal computer, and responds to the print requests from all the applications. When the printer driver is one-directional, no problem will result even if the applications 1, 2, 3 support only a part of the QuickDraw commands. However, in order to change the printer driver 6 to bidirectional and to enable the presentation by the application of the QuickDraw commands, released by the QuickDraw-common document conversion device 10-1, each application has to support all the QuickDraw commands, because the document may have been prepared by an application of a higher function. Thus, if commands of drawing system are refused as not understandable by an application in the transmission thereto, the printer driver 6 repeats the transmission by converting the data to those of the painting system.

It is also possible, for any application lacking the error correcting function, to prepare certain levels in the use of the QuickDraw, similar to the levels 1, 2, 3 of the JIS Kanji codes, and to effect the transmission by conversion to a lower level if it is predicted that the transmitted data cannot be understood.

Figure 2:
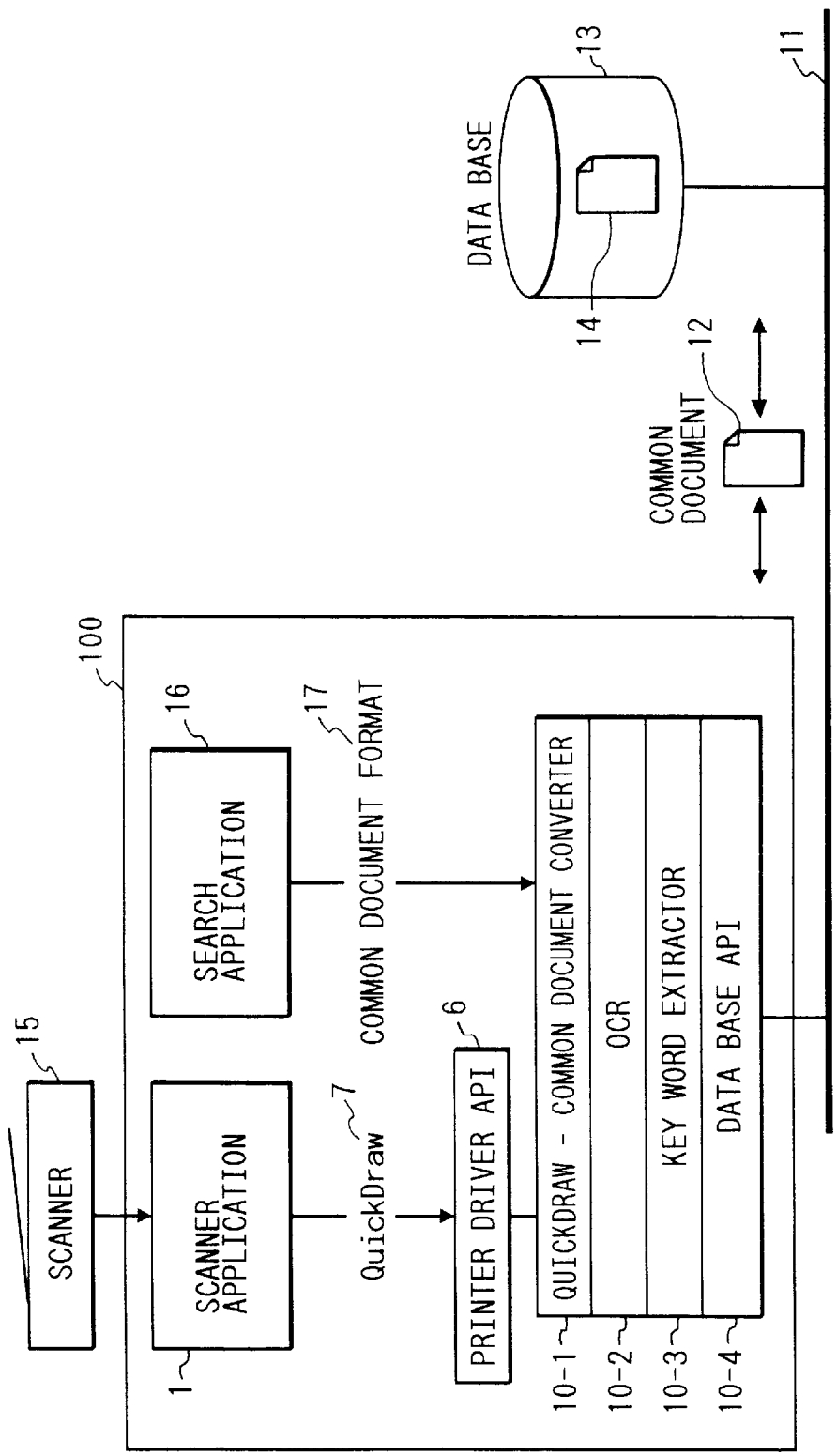
FIG. 2 is a view showing the architecture of a search application.

FIG. 2 shows the status of the search application, wherein functional elements that are the same as in FIG. 1 are represented by like refernce numerals. In FIG. 1 the document accumulation from the applications 1, 2, 3 to the data base 13 was explained. However exclusive search application 16 is needed for speedy search, since the commonly available applications are not designed for document accumulation/search. This application is directly connected to the QuickDraw-common document conversion device 10-1. The data format is not QuickDraw but a common document format 17. The device 10-1 is constructed as a general-purpose driver.

Figure 3:
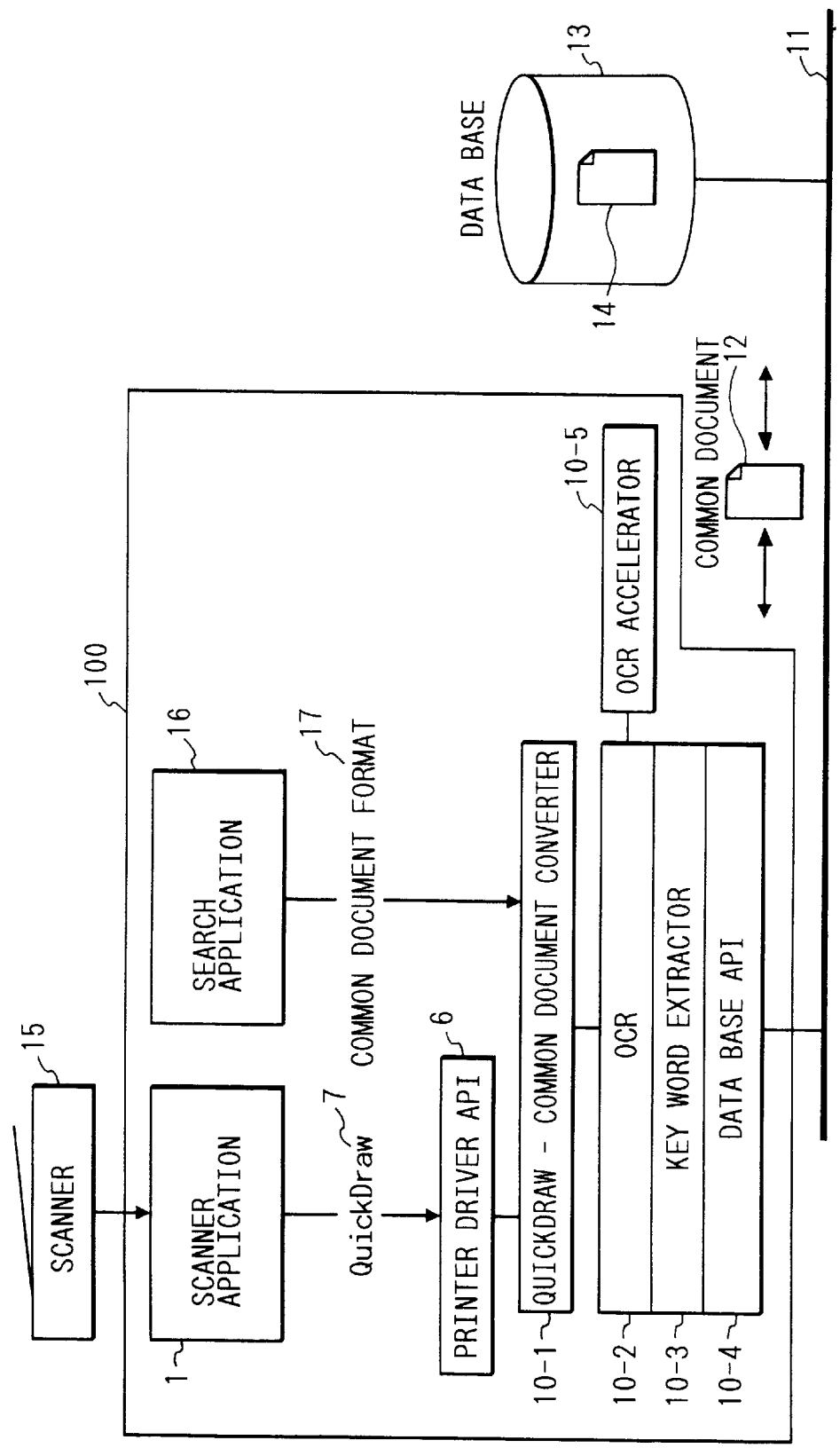
FIG. 3 is a view showing an embodiment employing an OCR accelerator.

FIG. 3 shows an embodiment in case an OCR accelerator 10-5, which is usually realized by a hardware, is used. As the optical character recognition requires time, a faster process can be realized by employing exclusive hardware for the process.

The QuickDraw-common document conversion device 10-1 is realized by a software, as a printer driver/general driver. On the other hand, the OCR 10-2, the keyword search device 10-3 and the data base API 10-4 are realized by software or hardware as general drivers operating in the background, and the operations of other devices are not interrupted even when the drivers are in operation.

Figures 4, 6:
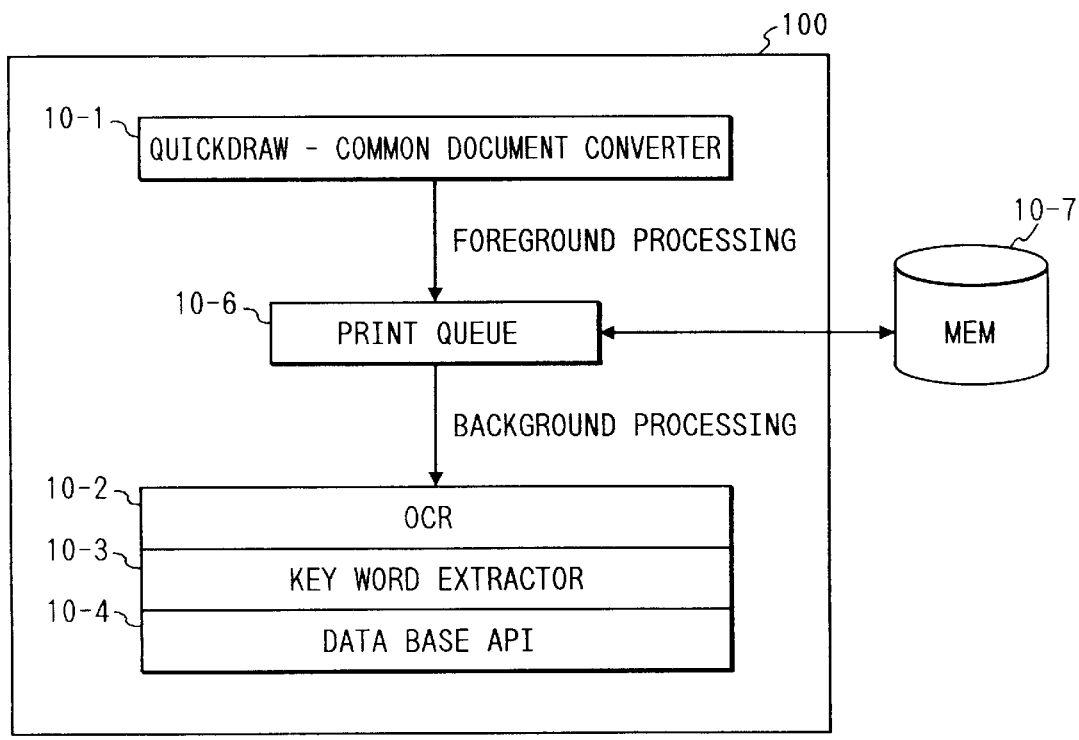
FIG. 4 is a view showing the principal part of a device driver.
FIG. 6 is a view showing the method of representation of table information in a text-tab format.

FIG. 4 shows such relationship, wherein what is shown a print cue 10-6, and a buffer memory 10-7. The QuickDraw document conversion device 10-1 operates integrally with the printer driver 6, and the output to the print cue 10-6 is executed in the foreground. On the other hand, the OCR 10-2 etc. receive the document data from the print cue 10-6 in the background and effects simultaneous parallel process with the applications 1, 2, 3, 16. The buffer memory 10-7 is provided for the print cue 10-6 to temporarily store the document data.

Figure 5:
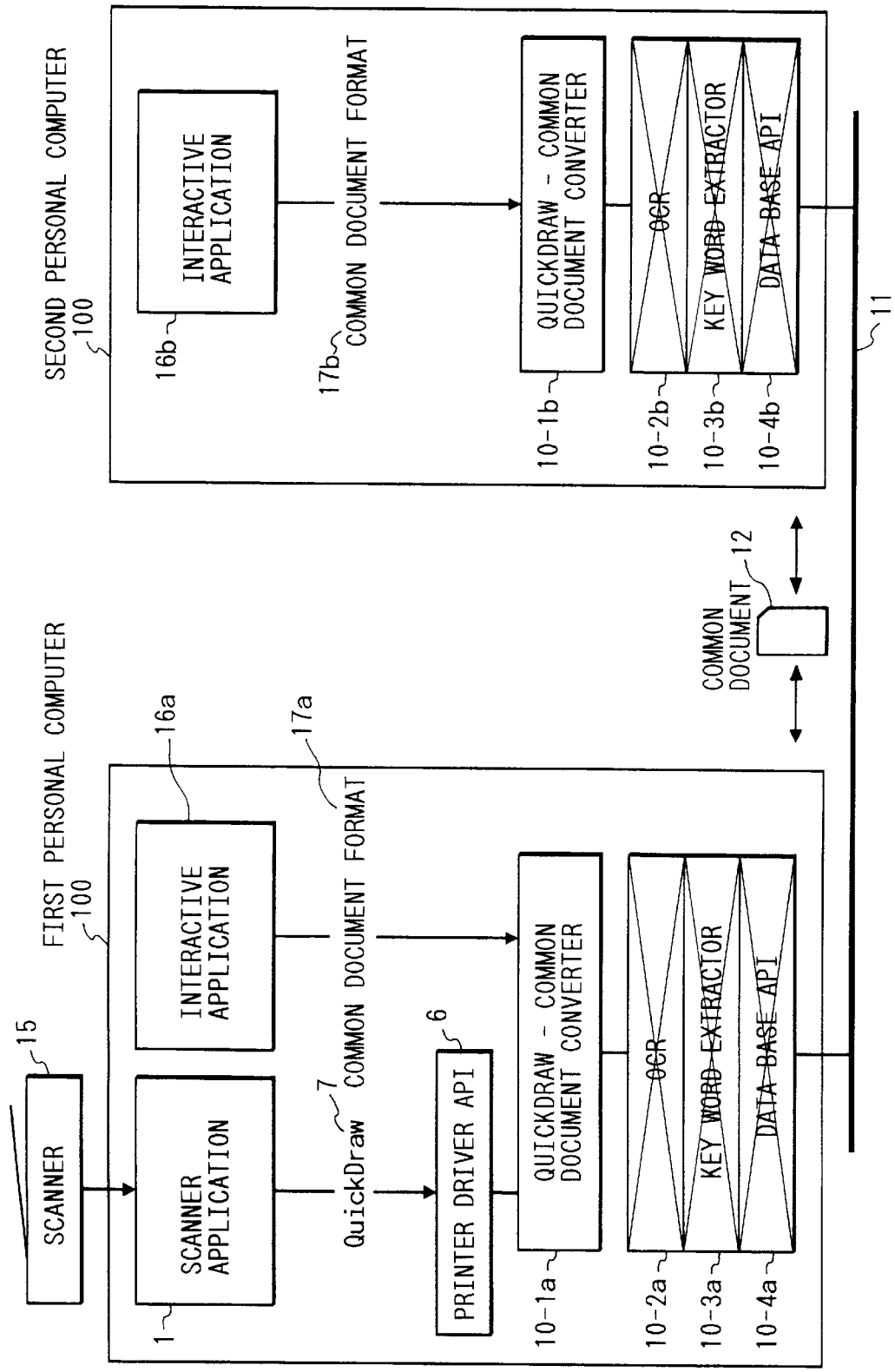
FIG. 5 is a view showing an application to an interactive conference system.

FIG. 5 illustrates an application to an interactive conference system, wherein the left-hand half is the same as the personal computer shown in FIG. 1 and the reference numbers are given with a suffix "a", while the right-hand half indicates a second personal computer, in which corresponding components are represented with a suffix "b". The first personal computer at the left is provided with a scanner but the second personal computer at the right lacks the scanner. In this case, the OCR, keyword search and data base API are unnecessary and are prevented from operation as crossed out. As long as the data on the network is in the common document format, the interface with the application can be either in the common document format or in another format, i.e., QuickDraw. The data from the scanner 15 can be used in bidirectional communication as it is converted into the common document by the printer driver 6.

In the present embodiment, explanation is dedicated only to a portion, exclusively used for filing of the printer driver, and such portion will hereinafter be called the "filing driver", which has the following functions:

(1) to enable filing from a commercially available application;

(2) the format follows that of the printer driver filing is realized by the operations identical with those in the printing to the ordinary printer from the commercially available application. More specifically, the GDI drawing commands, issued from the application, are converted into a predetermined file format and the file is stored in a hard disk. The dialog specific to the filing is displayed by the filing driver on a display (not shown);

(3) the filing driver can make access to a file server on the network, without particular consideration thereon, because the data base itself matches the network;

(4) file format:

For example, the GDI drawing command in the Microsoft Windows is stored in the data base, in the final form including the following information:

i) bit map image;
   ii) character information;
   iii) layout information; and
   iv) keyword information.

The bit map image is the information constituting the basis of filing. A bit map image of a size same as the sheet size selected by the "print dialog" is compressed by either of the followings:

i) monochromatic binary image JBIG;
   ii) multi-value image JPEG.

In the conventional filing, the character information is extracted by applying the OCR to the bit map image read by the scanner. This method is followed also in the filing driver, but the character information is directly extracted from the GDI codes transferred to the driver. Thus, the character information exists in following two kinds:

i) character information obtained by OCR; and
   ii) character information obtained by analyzing GDI codes.

The layout information is extracted from block selection (BS) information, which is a pre-treatment program of the OCR. Similarly, the layout information exists in following two kinds:

i) layout information obtained by block selection; and
   ii) layout information obtained by analyzing GDI codes.

The keyword information is extracted from the character information, utilizing a keyword generation routine.

The layout information extraction is executed in the following manner.

The layout information is extracted by analyzing the GDI codes. The layout information consists of page information and block information, and the data are extracted in the following procedure:

i) GDI code extraction (data input);
ii) block decomposition;
iii) block information extraction;
iv) page information extraction;
v) data base access (file generation).

The block decomposition/information extraction is conducted in the following manner.

Combination of banding

In case the GDI codes from the application are banded, all the GDI codes of an entire page are acquired and combined.

Discrimination of a bit map image (1) In the GDI codes transferred from the application, a portion defined as a bit map image (Image) can be easily identified as a bit map image by the description of Microsoft Windows SDK. As the entire image is stored in the file in the target 1, the image information itself may be discarded. The information stored include followings:

i) ID of bit map image;
ii) ID of the kind of bit map image (binary, halftone, color, full color);
iii) size of bit map image;
iv) position information on the printed image field; and
v) uppermost three histograms of standardized colors (8 colors) of bit map image (color standardization means conversion of upper 3 bits of R, G and B color components into 8 colors by a lookup table).

(2) GDI codes already discriminated are disregarded in the next discrimination.

Discrimination of a table

The GDI codes transferred from the Windows OS to the application are analized in the following manner, to discriminate whether a table is contained:

(1) Grouping: Out of the GDI codes transferred from the application, diagonal lines are disregarded but vertical and horizontal lines alone are selected, and the line portions with a coinciding X- or Y-coordinate are grouped. (At each addition of a coinciding line portion, the coordinate of said line portion is added to the criteria of coinciding.)

(2) Calculation of rectangular area: Based on thus grouped line portions, the maximum/minimum values of the X- and Y-coordinates are estimated as the rectangular area of the entire table.

(3) Calculation of number of cells: The numbers, obtained by respectively subtracting 1 from the kinds of X- and Y-coordinates thus found, are estimated as the numbers of cells respectively in the X- and Y-directions. If the number of cells is 2 or more both in the X- and Y-directions, there is identified a "table".

(4) Calculation of cell size: The difference between two points with the mutually closest X- and Y-coordinates is identified as the cell size.

(5) Discrimination of table: If the rectangular area contains a character therein, it is identified as a table, but, if not, it is estimated as a graphic pattern.

(6) Format: Characters in the "table" are collectively represented in the TAB-text format.

Figure 17:
FIG. 17 is a table showing an example of TAB-text format presentation.

For example, a table shown in FIG. 6 can be represented in the TAB-text format as shown in FIG. 17, wherein (T) indicates TABULATOR and (CR) indicates CARRIAGE RETURN.

It may also be represented by the SYLK format as shown in FIG. 18.

Discrimination of graphic pattern (1) Expansion of rectangular area: If a GDI code has a rectangular area, said area is defined as "expanded rectangular area", and, in case of a GDI code not having the rectangular area, such as a straight line, a rectangular area constituted by two points held by said code is defined as the "expanded rectangular area".

(2) Code grouping: GDI codes having an overlapping "expanded rectangular area" are identified to belong to a group.

Figure 7A:
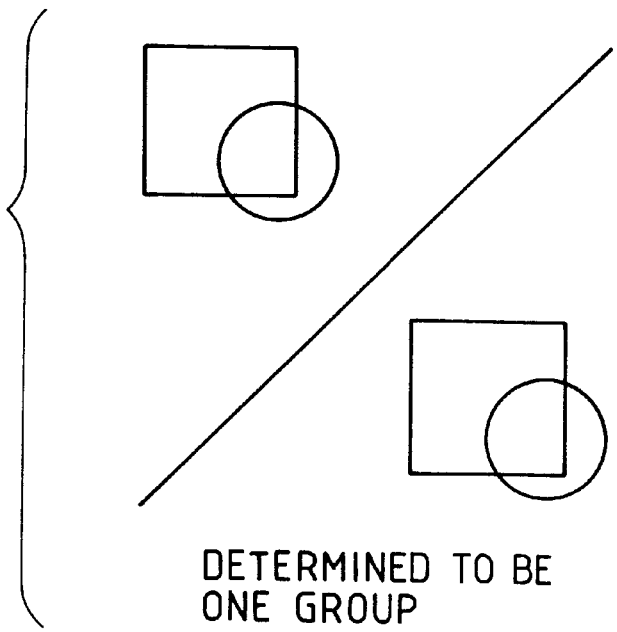
FIGS. 7A and 7B are views showing two examples of graphic grouping.
Figure 7B:
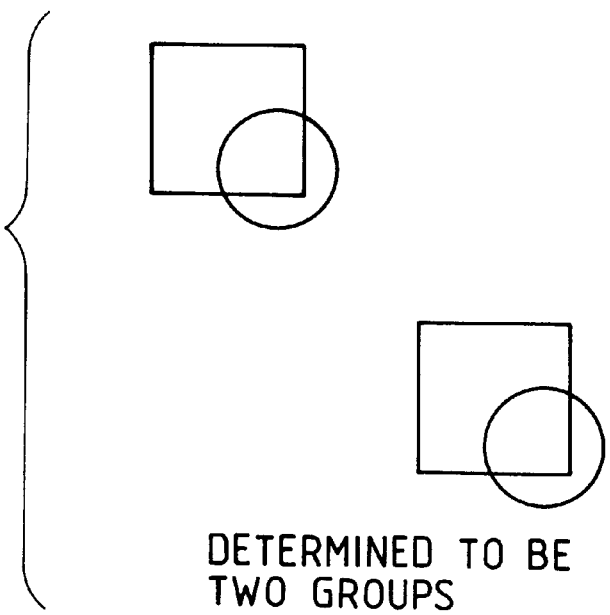

For example, a pattern shown in FIG. 7A is identified as a group because the straight line has a large rectangular area, but that in FIG. 7B is identified as two groups.

(3) The maximum/minimum values of the X- and Y-coordinates of thus grouped GDI components are defined as "rectangular area of graphic pattern", and thus grouped GDI components are called "picture".

(4) "Picture" is encoded, according to a basic rule shown in FIG. 8 to describe items as shown in FIG. 19.

(5) Classification of patterns: Graphic patterns are classified according to a rule shown in FIG. 20.

Discrimination of text portion (1) Connection of text: For any single character, if another single character is present within a "character width" calculated from the font size, they are connected as a "word". The "word" may not contain a space.

(2) Connection of "words": If "words" are present close to the distance of about a space, they are connected as a "line". The line may contain a space.

(3) Connection of "sentence": If "lines" are present within 3 times of the "font height", they are connected as a "sentence". The "sentence" may contain plural line returns. The word at the end of a line is not connected.

In case of a Japanese text, an entire line may be recognized as a work.

(4) Encoding of "sentence": The basic rule of encoding is similar to the case of "picture", and describes the items shown in FIG. 21 according to a basic structure in FIG. 9.

Extraction of block information

Each block is given an ID number, consisting of:

i) block ID;
ii) block position;
iii) block size;
iv) block attribute (text, graphics, table, image, graph, title, character code);
v) mother block ID;
vi) daughter block ID; and
vii) order in page.

Page information extraction

A title portion is discriminated as follows:

Step 1

(1) Discrimination of maximum font: a "string" having largest size is identified in the document.

(2) Discrimination of position: If the "string" of the largest size is positioned within the uppermost quarter of the sheet, it is identified as a title.

Step 2

(1) Discrimination of feature font: If a "string" featured by an underline, ( ), [ ] or { }, even same in the font size, is present within the uppermost quarter of the sheet, it is identified as a title.

Step 3

If none of the foregoing applies, the title is identified as absent.

Uniting of paper document and electronic filing

Figure 10:
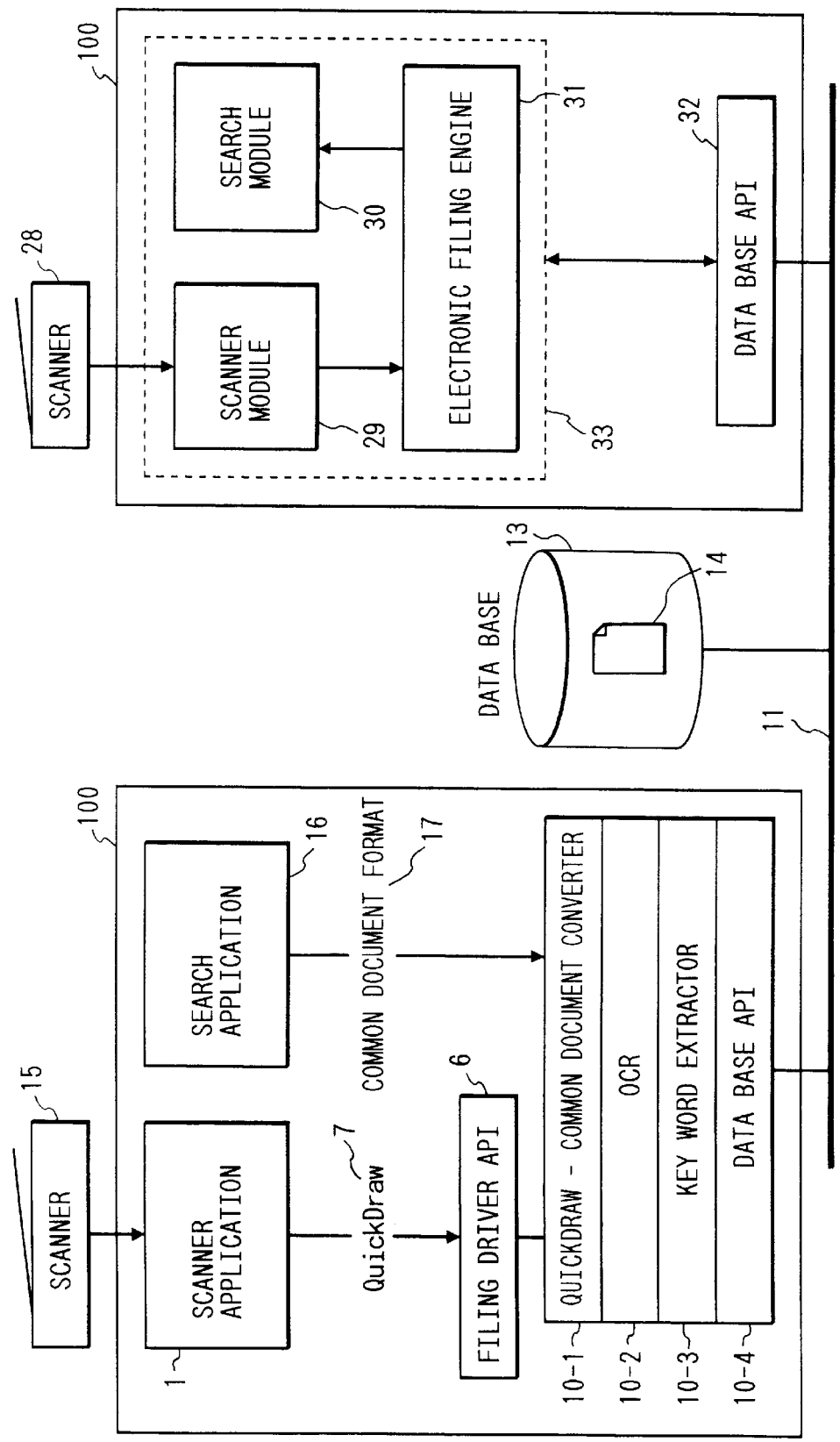
FIG. 10 is a view showing complication of a filing driver and electronic filing of paper document.

FIG. 10 illustrates unification of the above-explained filing from the commercially available application utilizing the filing driver, and the electronic filing of the paper document. For the convenience of explanation, the filing from the commercially available application will be called "DTP filing" while the paper document filing will be called "OCR filing".

At the center there is provided a data base 13, and the right-hand side shows the block diagram of the filing apparatus from the commercially available applications utilizing the filing driver explained above while the left-hand side shows the block diagram of the filing apparatus for filing the paper document by scanning.

In FIG. 10, same components as those in FIG. 2 are represented by same numbers.

There are shown a scanner 28, a scanner module 29 for driving said scanner 28, an electronic filing engine 31, and a search module 30. The scanner module 29 and the electronic filing engine 31 respectively correspond to the scanner application 1 and the search application 16. Also as indicated by a broken line, the scanner module 29 and the electronic filing engine 31 integrally constitute an "electronic filing application".

The electronic filing engine 31 has three major functions, i.e. block selection, OCR and keyword extraction. It instructs the scanner module 29 to read a paper original by scanning. The bit map image thus read is binarized in the scanner module 29, and the layout information is extracted by the block selection program in the electronic filing engine 31. The extracted information is the rectangular area information having the profile of text area or image area.

The information indicating the image area is stored in the data base, for layout search. Based on the result of block selection, the text area is converted into character codes by the OCR software.

Then the information, presumably usable as keywords, is extracted from the text information by the keyword extraction program, and stored in the data base 13 through the data base API 32. The stored document can be easily viewed by the search module 30.

The "OCR filing", extracting the layout information from the bit map image by the block selection program, is incapable of providing the layout information in the level of exactness and details as obtained by the "DTP filing", but both can be used in the rough search on the presence or absence of a bit map image or of a title. The character codes extracted by the OCR are not necessarily correct completely. However, certain level of exactness is acceptable because the extracted character codes are not re-used but only used for constructing an index for the search of the entire text, so that manual correction of the errors is not necessary.

The information stored through the data base API 32 includes:

i) result of compression of the bit map image in the entire document;

ii) result of block selection;

iii) result of OCR;

iv) information on candidate characters; and v) keyword information extracted from the result of OCR.

The compression of the bit map image in the entire document is executed by JBIG. It is designed for a monochromatic document, but it can easily prepare a thumbnail image by hierarchic encoding.

Figure 11:
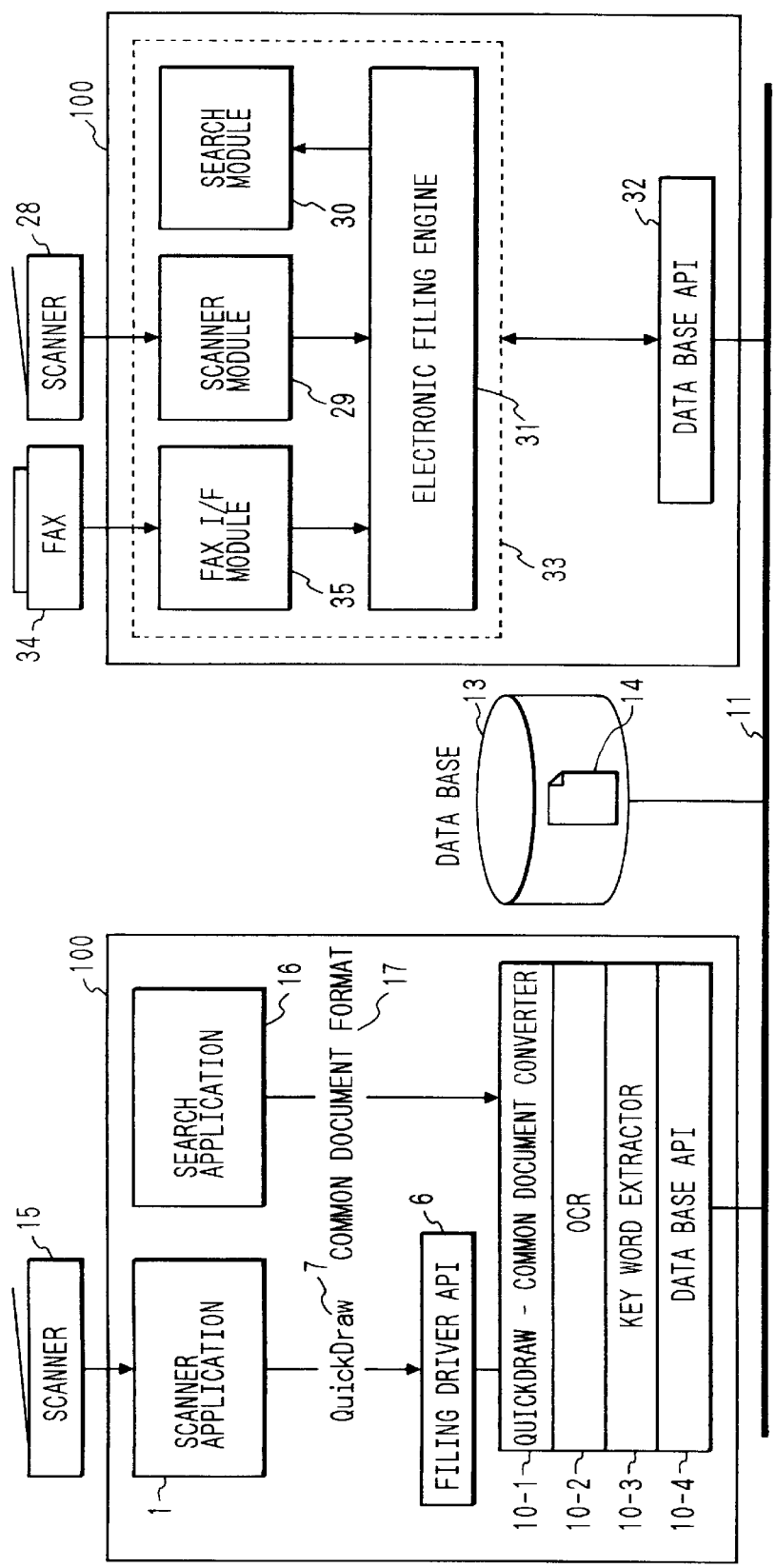
FIG. 11 is a view showing electronic filing of a facsimile document.

FIG. 11 shows facsimile reception as the input source of original. MMR image information received by a facsimile unit 34 is expanded by a facsimile I/F 35 into a bit map image, and transferred to the electronic filing engine 31. The process thereafter is identical to the case of reading a paper original with the scanner.

Explanation of flow charts

In the following there will be explained the functions of various units with reference to flow charts.

Figure 12:
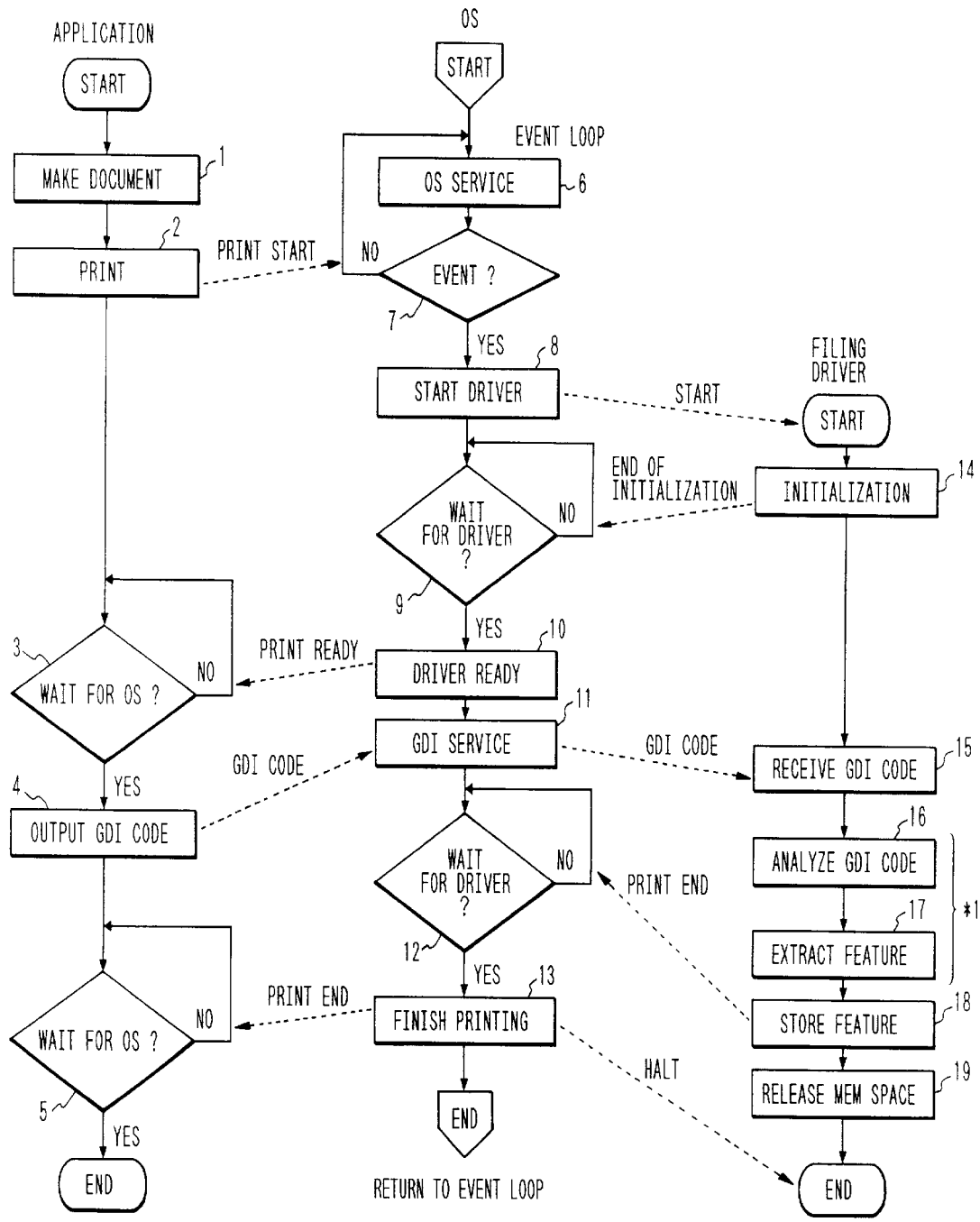
FIG. 12 is a flow chart showing the entire process of an embodiment.

FIG. 12 is a flow chart showing the functions of the application program, the OS (Windows) and the filing driver, shown respectively at the left-hand side, center and right-hand side.

The application, the OS and the filing driver behave like independent tasks, naturally in case of a multi-task OS but also in case of a single-task OS. Portions indicated by broken-lined arrows are in fact function calls, but they are usually represented as "messages" in the definition of C++ or classes, and such representation will be followed in the present description.

When the application prepares a document and stores it in the electronic file of the present invention, there is executed a process identical with that in the ordinary printing operation. Upon selection of a print menu (step 2), a print start message is sent to the OS. The OS, executing various OS services (step 6), enters an event loop (step 7), and, upon reception of the print start message from the application, starts the driver (step 8).

The filing driver activated by the message from the OS executes setting of registers and initialization such as securing of the memory space (step 14), and returns an initialization end message to the OS. During these operations, the OS awaits the responses from the driver in a loop (step 9).

Then it sends a message, indicating that the driver is ready, to the application (step 10).

The application gets out of the loop of the step 3 and sends the GDI code to be drawn, to the printer (step 4). Having received the GDI code, the OS transfers said GDI code without change to the printer driver if a GDI printer (driver) is employed, or after resterization of said GDI code in the OS if a bit map printer is employed (step 11). The filing driver emulates the printer driver, and can realize the GDI printer or the bit map printer by declaring so. In case of declaration as the GDI printer, the GDI codes directly transmitted from the OS and can be easily analized in the driver, and, if a bit map is requested, the resterization can be achieved by calling the system call of the OS.

In case of declaration as a bit map printer, there is executed a GDI service (step 11) for converting the GDI codes into a bit map in the OS, and the bit map is transferred to the filing driver. In case of the Windows, even in case of bit map, the bit map code contains, in a part thereof, the original GDI code so that the declaration as bit map is adopted in the present embodiment.

The filing driver analizes the received GDI code (step 16), extracts the feature of the content in the original (step 17) and stores it in the data base 13 (step 18). When a printing message arrives from the driver, the OS gets out of the loop awaiting the process of the driver (step 12), and sends printing completion message to the application (step 13) and terminates the operation of the filing driver, and swaps out of the memory space. The application, upon receiving the printing completion message from the OS, terminates the printing sequence (step 6).

In the following there will be explained, with reference to a flow chart in FIG. 13, the details of the steps 16 and 17 marked with * in FIG. 12.

Figure 13:
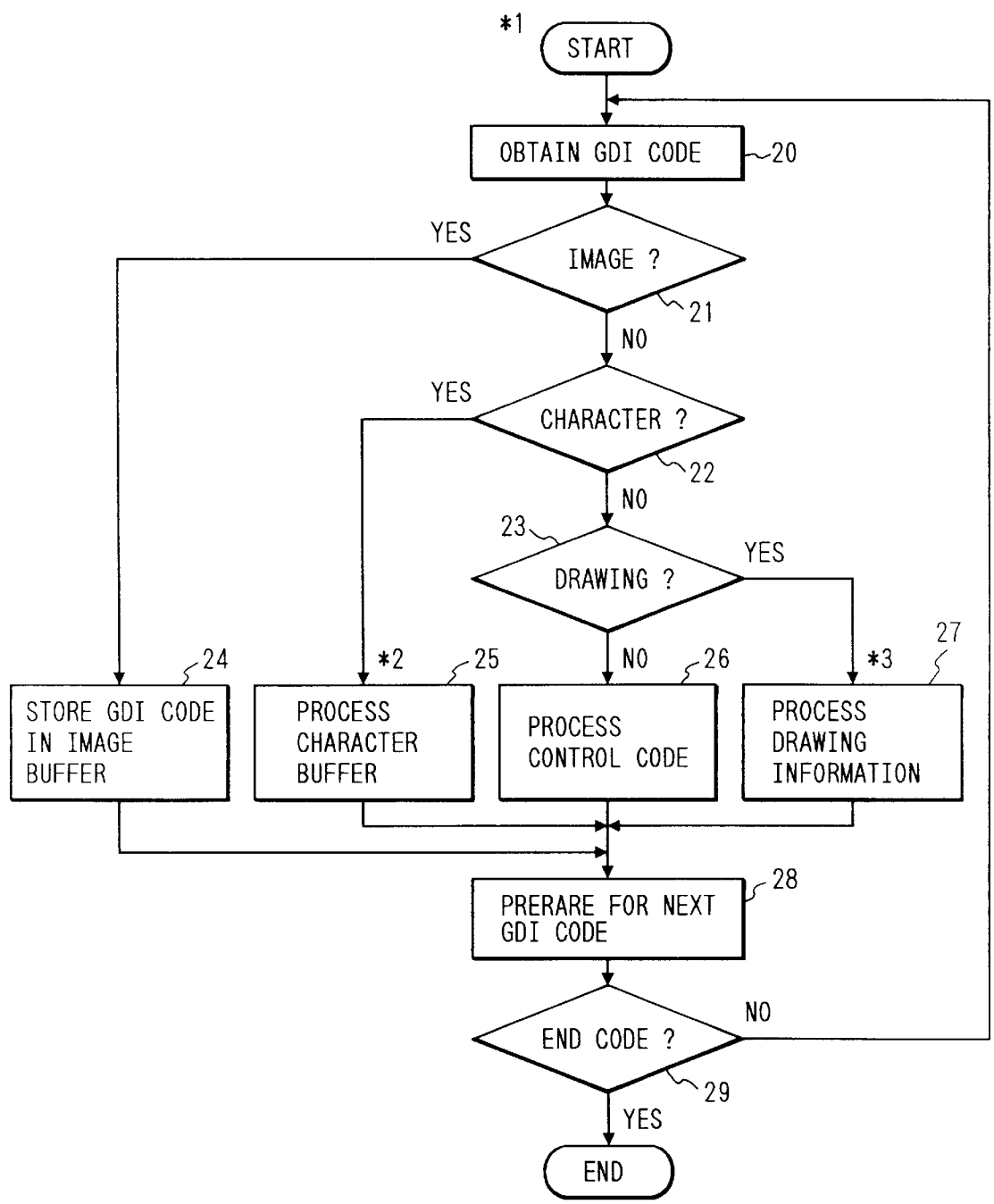
FIG. 13 is a flow chart of a process for GDI code analysis and feature extraction.

The flow chart in FIG. 13 shows the functions of the filing driver. The filing driver analizes the GDI code received from the application through the OS, and discriminates whether it is an image (step 21), a character (step 22) or a drawing (step 23). The GDI codes representing the image are compressed by an algorithm such as JBIG, JPEG or MMR (step 24) and stored in the image buffer of the data base 13. The drawing means a drawn matter utilizing linear or planar patterns formed by a group of vector information.

A GDI code indicating a character is stored in a character buffer in a RAM (not shown), and discriminated whether it is a title by a character buffer process (step 25). Then various information on character (character code, style, character color etc.) are stored and registered as a keyword in the data base 13.

A GDI code indicating a drawing is subjected to discrimination of table or graphic pattern in the drawing information process routine (step 27), and is also subjected to a statistical process.

If the GDI code is neither of the foregoing, it is a control code, and is subjected to a control code process in a step S26. The control code indicates designation for example of sheet size, sheet direction, resolution, margins, page number or number of prints.

After the feature extraction (step 17), composed in fact of steps 24, 25, 26 and 27, there is started preparation for acquiring a next GDI code (step 28). If the control code is an end code, the GDI code analysis is terminated, but, if not, the sequence proceeds to the step 20 for acquiring the next GDI code.

In the following there will be explained, with reference to a flow chart in FIG. 14, the details of the step 25 marked with (*2) in FIG. 13.

Figure 14:
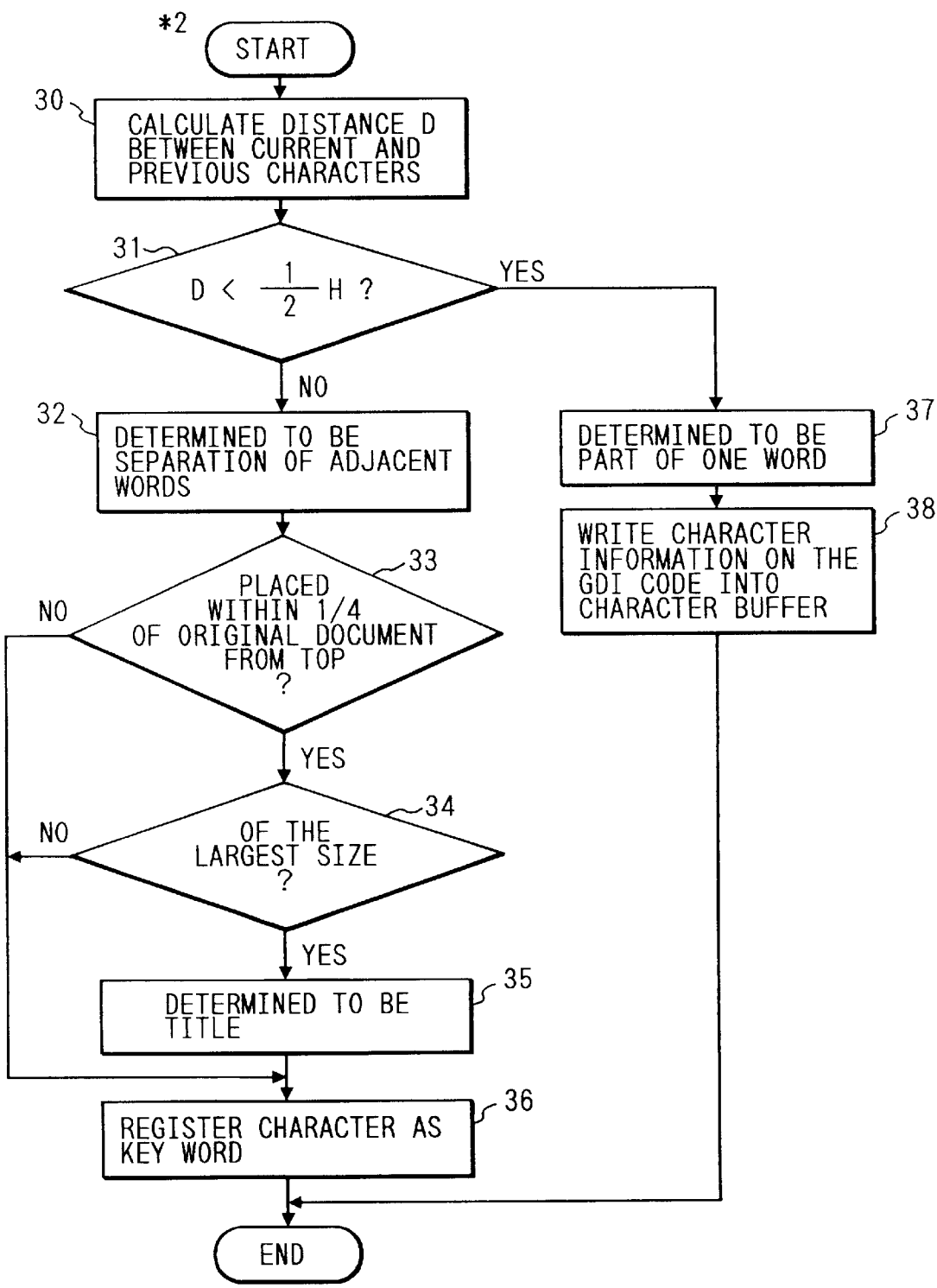
FIG. 14 is a flow chart of a character buffer process.

The flow chart in FIG. 14 shows the function of the filing driver. It analyzes the character information stored in the character buffer, discriminates whether it is a title character, and effects registration of a keyword.

In case of GDI code, the character codes are not necessarily given as a string (sentence). The application software, providing a string of GDI codes, is usually limited to an editor software, and the DTP applications of higher class often effect drawing character by character. Such high-classed DTP applications can provide sophisticated sentence representation exceeding the representing ability of the GDI codes, so that the drawing is effected character by character.

Since such drawing manner does not allow search in the electronic file, it is necessary to convert the characters into words or sentence, and such conversion is done in the steps 30 and 31. If the distance between characters is more than ½ of the height H of the characters, there is discriminated the presence of a space between the characters (step 32), but, if not, the characters are identified as a part of a word (step 37). In the latter case, in order to find the partition of the word, the character information (font, style, character color, character code) of thus processed GDI code is stored in the character buffer, and the sequence gets out of this routine and proceeds to a step 28 for acquiring a next GDI code.

On the other hand, when the distance between characters is more than ½ of the height H of the characters, there is discriminated the end of a word and it is registered as keyword in the data base 13. Among these characters, those estimated as the title are stored separately as the title, among the keywords, for the search for the title characters. The title identifying algorithm identifies a title character if a character is identified present in the uppermost quarter of the vertical size of the original (step 33) and if said character is largest in size in the original (step 34), and attaches information indicating that said character is a title character. Other characters are subjected to keyword registration as non-title characters (step 36). The title itself is naturally a keyword.

In the following there will be explained, with reference to a flow chart in FIG. 15, the details of a portion marked as (*3) in FIG. 13.

Figure 15:
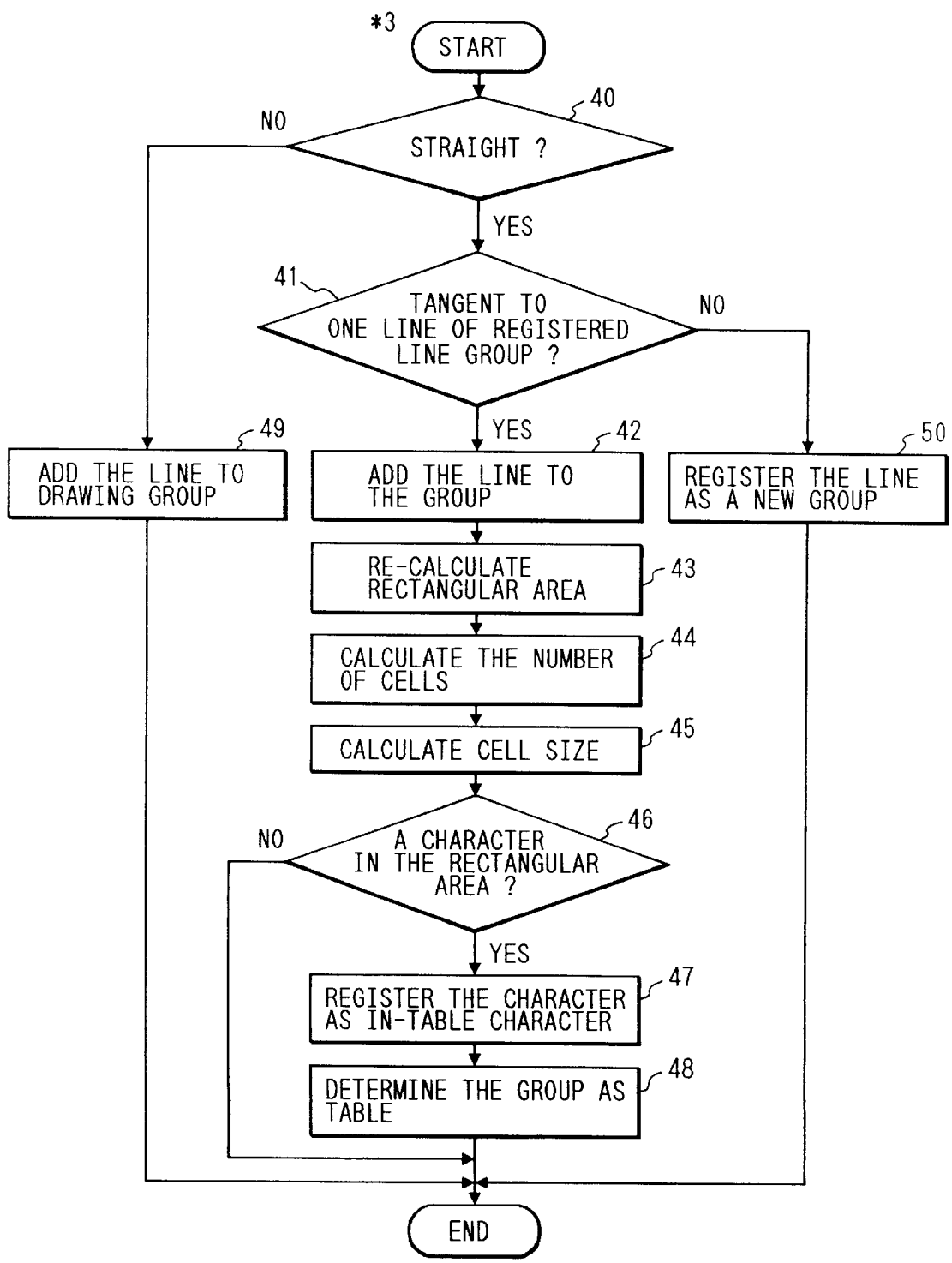
FIG. 15 is a flow chart of a draw information process.

The flow chart in FIG. 15 shows the functions of the filing driver for processing the drawing information. At first there is discriminated whether the GDI code indicates a straight line (step 40), and, if so, the sequence enters a routine (steps 41–48) for discriminating a table, but, in other cases such as a circle, an oval, a rectangle, a polygon, a diagonal line or a curved line, it is simply added to the group of drawn pictures (step 49) and stored in the data base.

In case a straight line is identified in the step 40, there is discriminated whether it is in contact with any of the straight line group already registered in the data base 13 (step 41), by judging whether any of the X- and Y-coordinates of two points (starting point and ending point) of the straight line in current processing coincides with any of the coordinates of the two points of any of the straight line group already registered and whether other coordinates are within a predetermined range.

Figure 16:
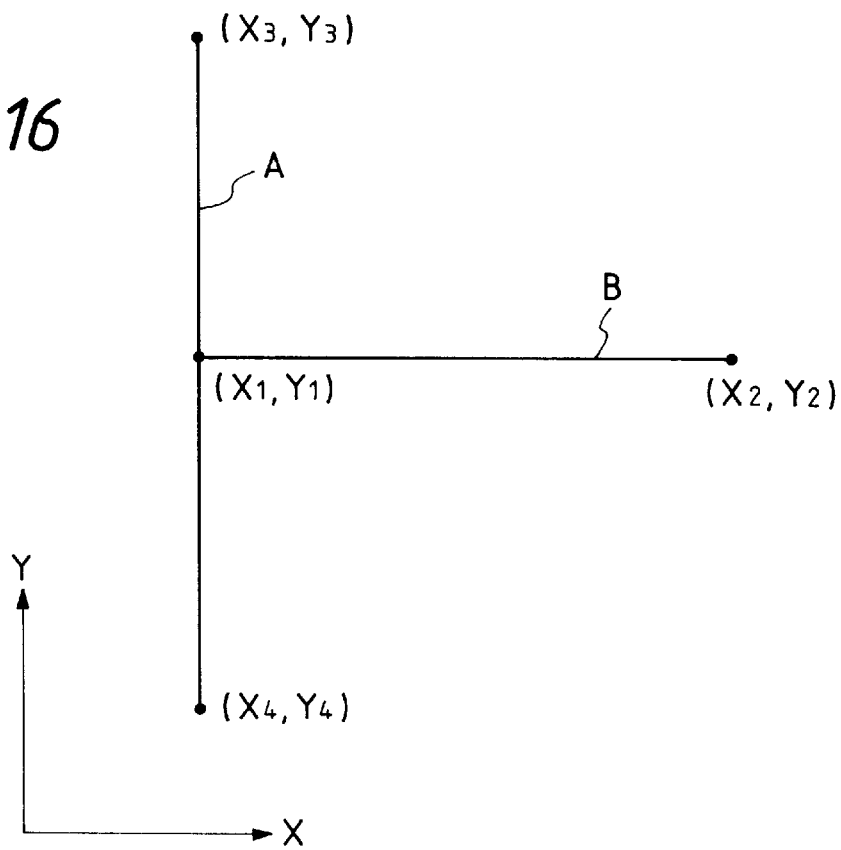
FIG. 16 is a view showing the principle of a straight line analysis.

As an example, in a situation shown in FIG. 16, there is merely required to check:

$$X_1 = X_3$$

in order to discriminate whether two lines A, B are in mutual contact.

In this case there also stands a relation:

$$X_1 = X_3 = X_4$$

since it is already known that the lines A, B are not diagonal. On the other hand, as the Y-coordinate of the line B has to be between the starting point and the ending point of the line A, there should stand a relation:

$$Y_4 \leq Y_1 \leq Y_3$$

Thus, the mutual contact of two lines can be identified if any three mutually coincide among four X- or Y-coordinates of the two lines and if, with respect to a line having two coinciding X- or Y-coordinates, the Y- or X-coordinate of the other line is positioned between the Y- or X-coordinates of the former line. If these conditions are met for both the X- and Y-coordinates, the two lines are mutually perpendicular.

Again referring to FIG. 15, a straight line identified not in contact with any of the straight line groups is registered as constituting a new straight line group (step 50).

On the other hand, a straight line, identified as contacting a straight line group, is added as a member of said group (step 43).

An area defined by four maximum and minimum values of the X- and Y-coordinates of a straight line group is defined as a rectangular area of said straight line group. Said rectangular area is recalculated whenever a new straight line is added (step 43).

There is determined the number of X- or Y-coordinates held by the straight line group, and said number minus 1 is defined as the number of cells (step 44).

Also the X-coordinates and the Y-coordinates are respectively arranged in the order of magnitude, and the difference of the mutually adjacent coordinates is calculated as the cell size (step 45).

If a character is present in the rectangular area of the straight line group, said character is separately registered with information indicating that said character is a character in the table (step 47), and said straight line group is identified as a table (step 48).

A straight line group, completely free from characters is not regarded as a table but registered as ordinary straight lines in the data base 13.

As explained in the foregoing, the present invention enables united electronic filing of the paper documents and the computer file documents, prepared by the DTP applications, whereby the electronic filing, which has been rather isolated, can be effectively and handily utilized in combination with the DTP filing.

In contrast to the conventional electronic filing that requires a specially trained operator, the electronic filing system of the present invention allows operation by anyone from his own desk, whereby culture dependent on paper can be renovated.

Also in contrast to the conventional electronic filing that is dependent on search by keyword only, the present invention enables search by the featuring layout of the original, such as an original with a title containing "baseball", with two pictures and a table and keyword for a player's name, so that the desired document can be retrieved quite speedily.

Also the compression of the bit map image, utilizing the JBIG hierarchic encoding theory, allows to utilize the visual search by the thumbnail (small) image display, so that it is made possible to effect the search while visually checking the content of the original.

Figure 22:
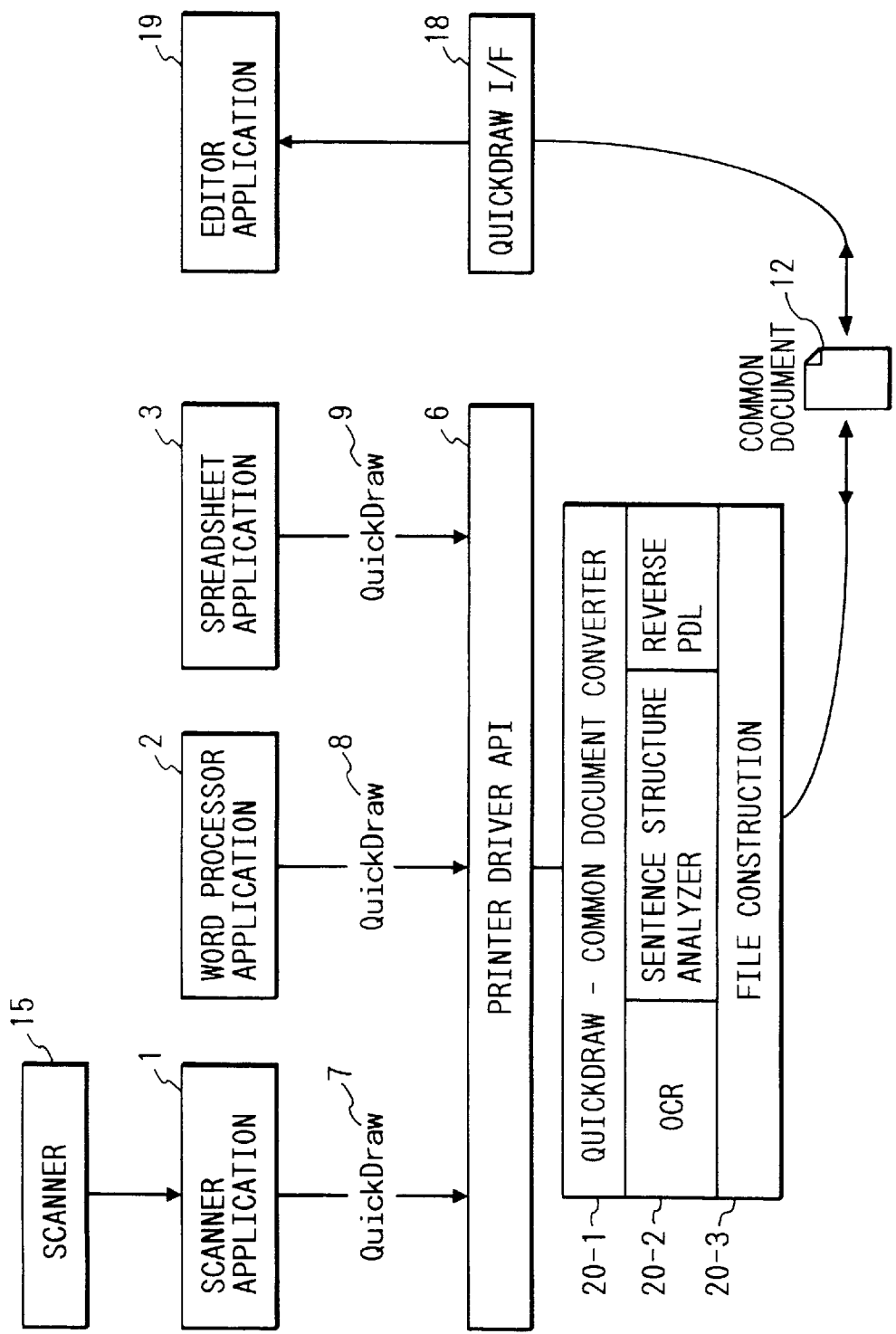
FIG. 22 is a block diagram showing another embodiment of the electronic filing apparatus of the present invention.

FIG. 22 is a block diagram of an electronic filing apparatus constituting another embodiment of the present invention, wherein components same as those in FIG. 1 are represented by same symbols.

In FIG. 22 there are shown a Quickraw-common document conversion driver interface 20-1; a collective unit 20-2 including an OCR unit, a sentence structure analyzing unit and a reverse PSL unit; and a file constructing routine 20-3. The unit 20-1 analizes the QuickDraw codes at the printing and classifies them into a character portion, a vector drawing code portion, a bit map image portion and a halftone image portion. The bit map image portion and halftone image portion are OCR processed to extract the character portion as codes.

The vector drawing code portion is processed by the reverse PDL unit, in the unit of a group of certain drawing codes, and is classified into functional elements such as "table", "picture", "mark" and "closed curve". Codes not falling into the category of functional elements are classified for example as "line", "circle", "rectangle", "oval", "arc" and "free curve".

The sentence analyzing unit 20-2 analyzes the structure principally of the text portion and classifies it for example into "title", "chapter", "section", "paragraph", "header", "sentence", "footer", "page", "date" etc. The structure that does not fall into these classifications is handled as a "text". The document, thus analyzed and classified, is handled by the file constructing routine 20-3 as a common document.

Once classified as the common document, it can be re-edited by an editing application 19 that can understand its file format, through a standard OS interface 18.

In the following there will be explained, with reference to FIGS. 1 to 5 and 22, the corresponding relationship of various means between the present embodiment and another embodiment, and the functions of such means.

In a first feature, the present embodiment is provided with a computer system capable of processing file information of documents, tables, and images prepared by activating plural application programs (application programs 1, 2, 3) based on a predetermined operating system (DOS/V, Kanji Talk, UNIX); printer driver means (printer driver 6) for converting the drawing information, transmitted from the application programs activatable by said computer system, into a predetermined print data format defined by said operating system; conversion means (in case of the present embodiment, QuickDraw-common document conversion device 10-1 to be incorporated, as a sub-driver, in the printer driver 6) for converting the print data, converted into the predetermined print data format by said printer driver 6, into a common document file format that can be directly referred to by said plural application programs; and memory means (data base 13) for storing a common file in said common document file format converted by said conversion means. When the drawing information, transmitted from the application programs activatable by said computer system, is converted by the printer driver 6 into the predetermined print data format defined by said operating system, the QuickDraw-common document conversion device 10-1 converts the print data, converted into the predetermined print data format, into the common document file format that can be directly referred to by said plural application programs and stores thus converted common file (common document 12) of said common document file format in the memory medium, whereby the drawing information transmitted from the application programs to the printer driver can be managed as a file commonly available to said application programs (cf. FIGS. 1 to 3).

In a second feature, a search driver (search application 16 (cf. FIG. 3) etc.), incorporated in the computer system as a general-purpose driver for the operation programs, searches the common files of the common document file format stored in the memory means (data base 13) through the QuickDraw-common document conversion device 10-1, thereby enabling direct processing of the common files by the application programs.

In a third feature, the printer driver 6 analyzes and classifies the drawing information transmitted from the application programs into the character portion, vector drawing portion, bit map image portion and halftone image portion and generates compressed data from each portion, whereby the data amount registered in the memory medium can be kept minimum.

In a fourth feature, the conversion means (QuickDraw-document conversion device 10-1) converts the compressed data, converted by the printer driver into the predetermined print data format, into the common document file format that can be directly referred to by said plural application programs, whereby the compressed data, obtained from the drawing information transmitted from the application programs to the printer driver, can be managed as a file commonly available to said application programs.

In a fifth feature, the optical character recognition means analyzes the bit map image portion and the halftone image portion, classified by the printer driver 6 to recognize and extract the character information by the OCR device 10-2 (constructed as a sub driver of the printer driver 6 in the present embodiment), and thus extracted character information is added to the already classified character information, whereby the character information in image information can be utilized as character information.

In a sixth feature, the common file is rendered transferrable among the electronic filing apparatus through the predetermined network (cf. FIG. 5), whereby the files generated by the application programs (application programs 1, 2, 3) are rendered processable as the common files on the network.

As explained in the foregoing, based on a fact that the output data format in case of printing by the application is standardized for each OS, it is made possible to manage the documents prepared by any commercially available application program in a unified format, regardless of the architecture of the personal computer, by adding functions of "conversion to unified file format", "OCR" and "keyword search" to the printer driver.

Also the present embodiment provides an inexpensive system which allows to incorporate the document accumulation/search apparatus that has been available only in stand-alone basis in the software and hardware, into the commonly available computer as a document accumulation/ search function utilizing various commercial application programs as the front end.

Furthermore, the present invention is applicable not only to a system consisting of plural equipment but also to an apparatus consisting of a single equipment. It is likewise applicable in case the present invention is achieved by the supply of a program to a system or an apparatus.

Second embodiment

Figure 23:
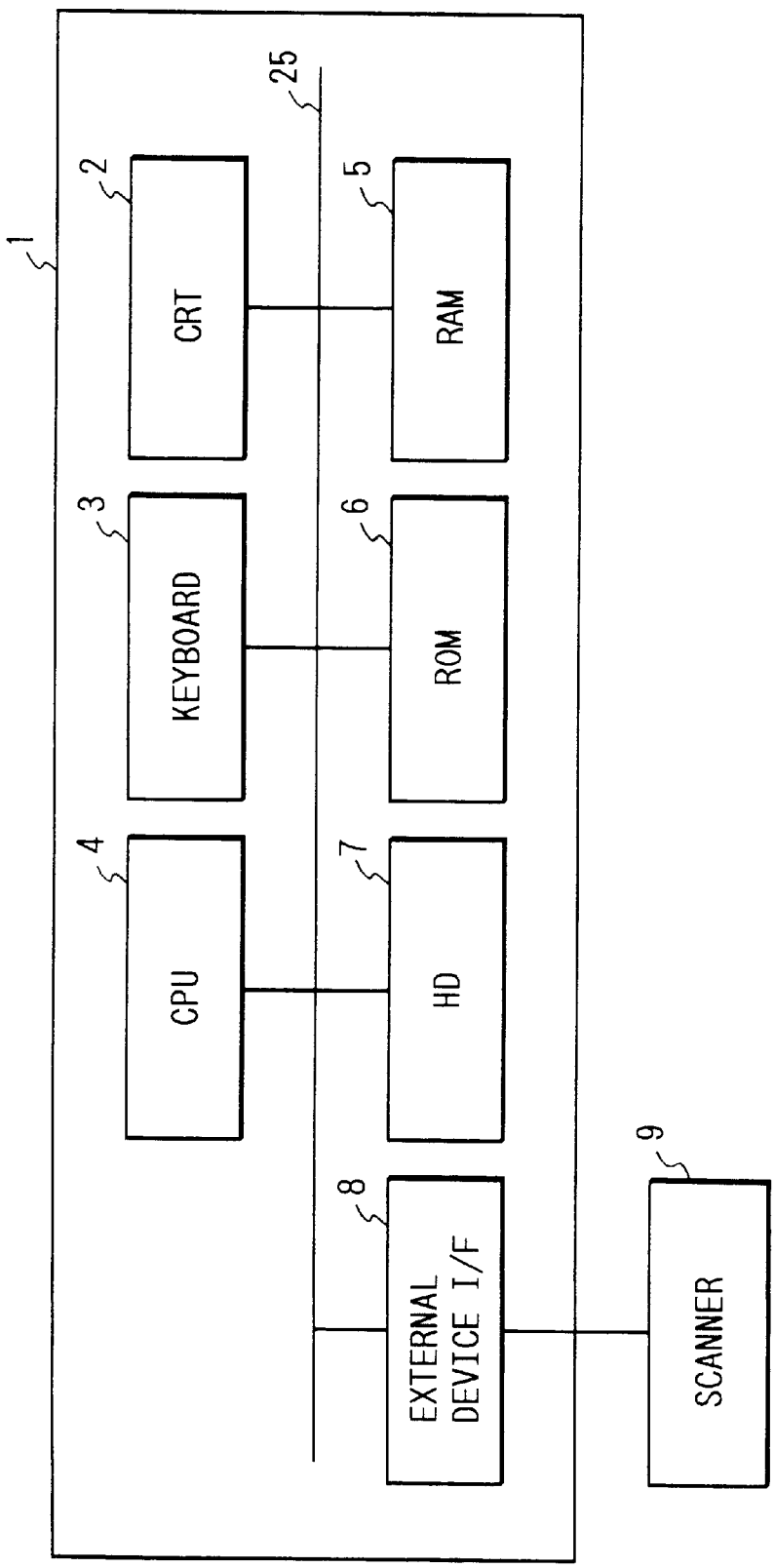
FIG. 23 is a block diagram of an electronic filing apparatus constituting a second embodiment of the present invention.

FIG. 23 is a block diagram of an electronic filing apparatus constituting a second embodiment of the present invention.

Figure 25:
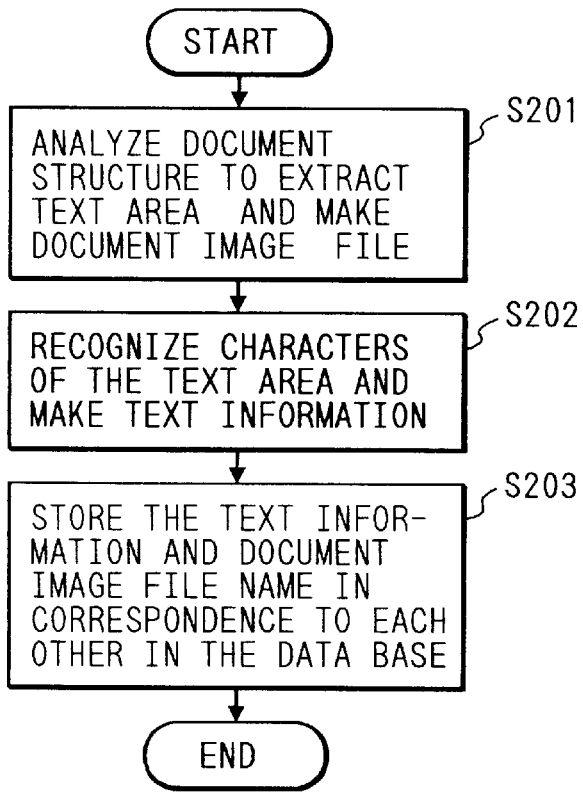
FIG. 25 is a flow chart showing an operation of registration of an image, entered by a scanner, in the data base.
Figure 26:
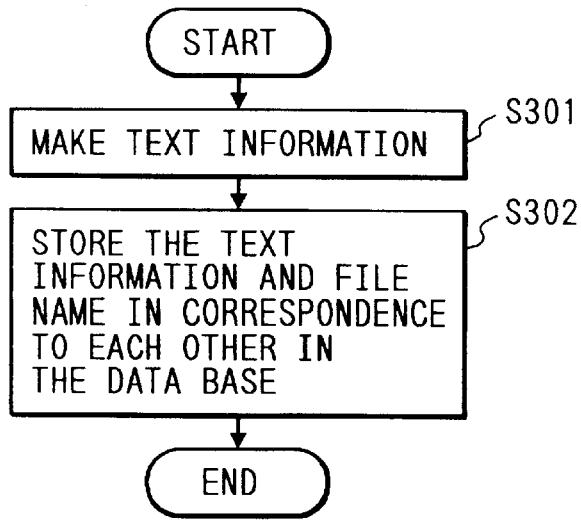
FIG. 26 is a view showing an operation of registration of text information, prepared by an ordinary application, in the data base.
Figure 27:
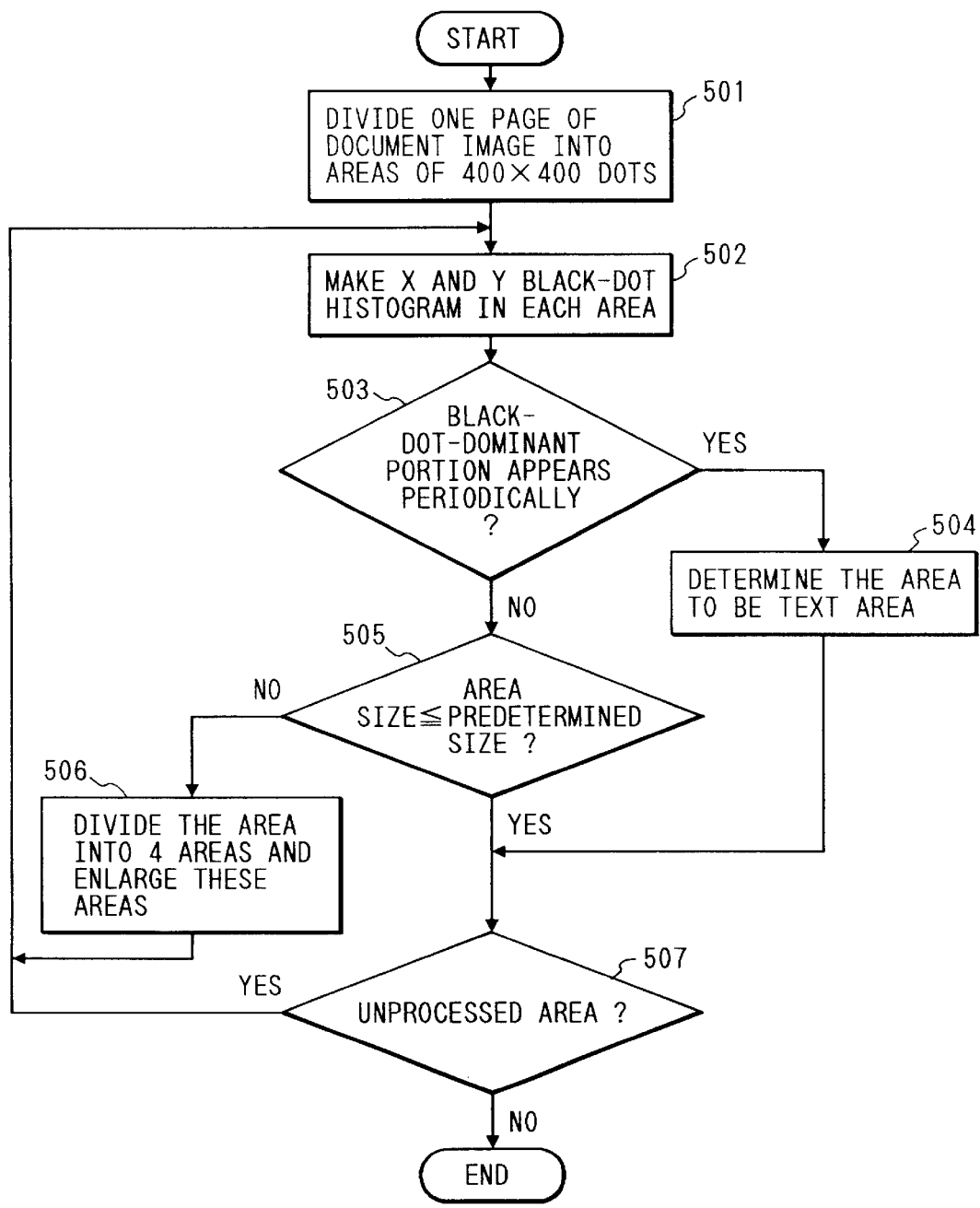
FIG. 27 is a flow chart of the function of document structure analyzing means.

There are shown an electronic filing apparatus 1, a CRT 2, a keyboard 3, a CPU 4, a RAM 5 used for program loading or as a work area, a ROM 6 storing programs corresponding to flow charts in FIGS. 25, 26 and 27, a hard disk (HD) 7 for storing the programs corresponding to said flow charts, image data, data base information etc., an external interface 8 for entering image data from a scanner, and a scanner 9. These devices and memories are connected by a bus 25.

In the following there will be briefly explained the flow of the data read by the scanner 9.

At first the image data entered from the scanner 9 are temporarily stored, through the external interface 8, in the RAM 5. The CPU 4 analyzes the image data according to a sentence structure analyzing program and a character recognition program loaded into the RAM 5 from the hard disk 7 or the ROM 6, thereby generating text information, and stores the image data in the hard disk 7. Then the CPU correlates the file names of the text information and the image data, according to a data base registration program loaded from the hard disk 7, thereby generating data base information and stores it in the hard disk 7.

Figure 24:
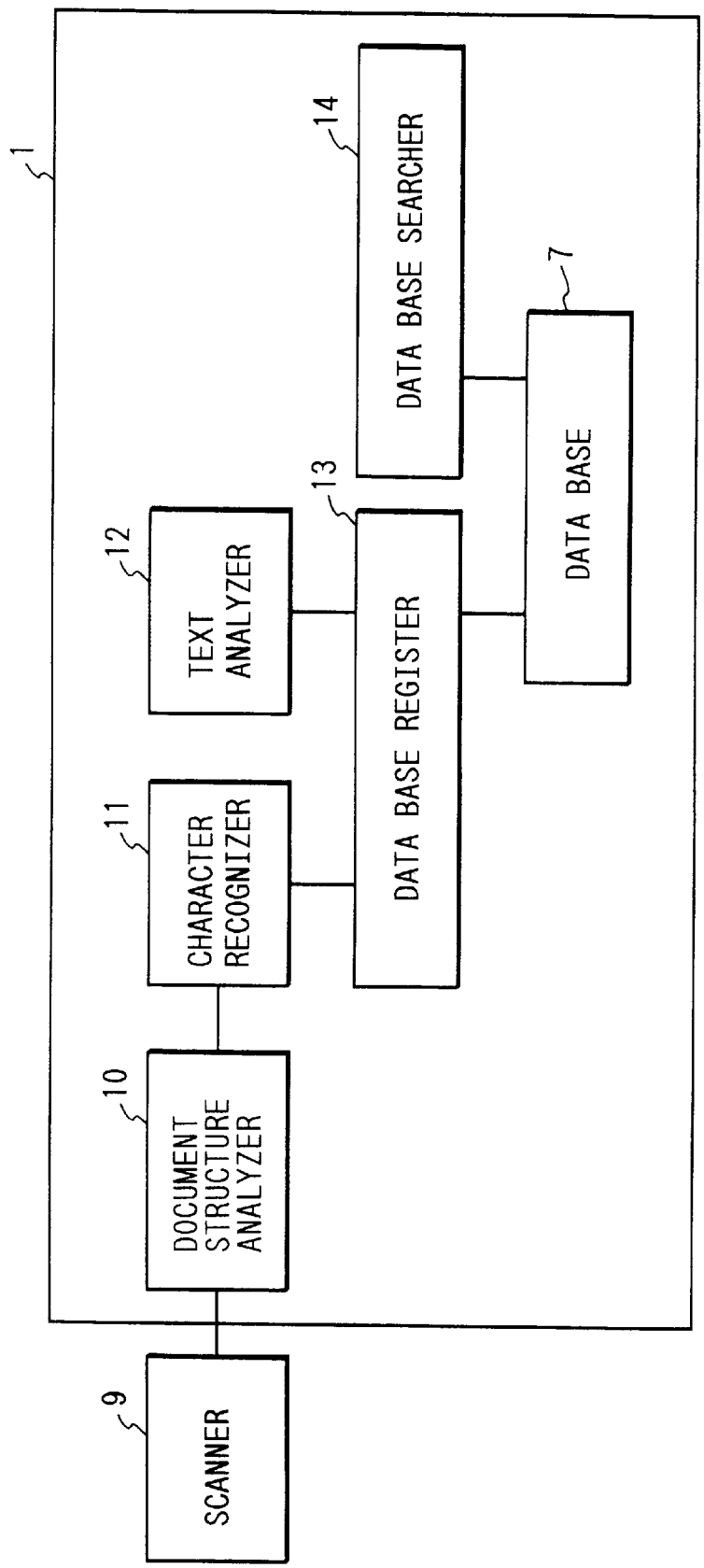
FIG. 24 is a view showing the configuration of a second embodiment of the present invention.

FIG. 24 is a view showing the configuration of the second embodiment.

In FIG. 24, components same as those in FIG. 23 are represented by same numbers. There are shown an electronic filing apparatus 1; a document structure analyzing means 10 for effecting document layout analysis on the document image entered by the scanner and extracting a text area; character recognition means 11 for effecting character recognition on the text area and generating character codes, text analyzing means 12 for analyzing text information in the document information of an ordinary application; data base registration means 13 for registering text information in the data base; data base search means 14 for effecting search of text information in the data base; a data base 7 corresponding to the hard disk 7 in FIG. 23; and a scanner 9.

In the following there will be explained the control sequence according to FIG. 24.

When a document is entered by the scanner 9, the document structure analyzing means 10 divides the document image into areas thereby extracting the text area, and generates a document image file. The character recognition means effects character recognition of the text area and generates text information, i.e. character codes. The train of thus generated character codes is correlated with the name of the document image file and is registered in the data base 7 by the data base registration means 13.

The text analyzing means 12 is activated, in the ordinary application, by a process similar to the printing, extracts the character code from the drawing code issued by the operating system, such as the GDI (Graphic Device Interface) code in case of Microsoft Windows, correlates it with the file name and registers it in the data base by the data base registration means. When a train of characters is designated by the operator, the data base search means 14 searches the entire text information registered in the data base 7, and releases the document image file name or the file name correlated with the text information containing the designated train of characters.

FIG. 25 is a flow chart showing the function of registration of the document image, entered by the scanner 9, into the data base 7.

A step 201 analyzes the structure of the document image entered by the scanner 9 to divide it into areas, then extracts the text area and generates the document image file. The process of the step 201 will be explained later in more details with reference to FIG. 27. A step 202 effects character recognition on the text area extracted in the step 201, thereby generating text information. The character recognition will not be explained further as already known character recognition technology is employed. A step 203 correlates the text information, generated in the step 202, with the document image file name, and effects registration in the data base 7.

FIG. 26 is a flow chart, showing the function of registration of the document information, prepared by the ordinary application, in the data base.

A step 301 analyzes the drawing codes and generates the text information, and a step 302 correlates the text information generated in the step 301 with the file name and registers them in the data base.

FIG. 27 is a flow chart, showing the function of the document structure analyzing means.

A step 501 divides the document image of a page into small areas, each of 400 dots in the vertical and horizontal directions. A step 502 prepares, for each area, histograms of black dots in the X- and Y-directions. A step 503 discriminates, from said histograms, whether the black dots appear in periodical manner, and, if so, a step 504 identifies the area as a text area and the sequence proceeds to a step 507. If not periodical, a step 505 discriminates whether the area exceeds a predetermined size, and, if exceeding, a step 506 divides the area into four and prepares 4 expanded sub-areas and the sequence returns to the step 502. The step 507 discriminates whether any of the areas remains unprocessed, and, if all the areas have been processed, the sequence is terminated, but, if any area remains unprocessed, the sequence returns to the step 502. This process allows to extract the text area from the document image data.

Figure 28:
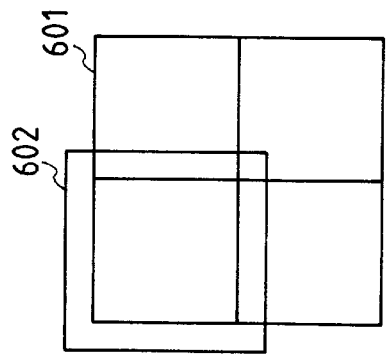
FIG. 28 is a view showing the function of the document structure analyzing means.

FIG. 28 shows one of the small areas prepared in the step 506, wherein 601 indicates an original area and 602 indicates one of the divided and expanded sub-areas.

In the present embodiment, the operator is rendered capable of requesting the document information, prepared by an ordinary application, by effecting a process same as in the printing operation and activating the text analyzing means, thus being relieved from cumbersome operations. Also the text information search effects search on the entire text of the document information, so that the text including the designated character train can be securely detected. Besides the document image entered by the scanner is automatically subjected to extraction of the text area and character recognition, and the text information search is executed on the entire result of character recognition, so that registration and search can be achieved without cumbersome process. Furthermore, the document prepared by the ordinary application and that entered by the scanner can be searched in the same manner, so that the operator need not be concerned with how the document was prepared.

Third embodiment

In the foregoing embodiment, the text information is registered in the data base, but it is also possible to provide document structure analyzing means 10 capable of analyzing the layout information such as paragraph layout in the document, and presence/absence of image or graphic pattern, thereby registering such layout information in the data base and effecting search with such layout information.

For example there can be searched only documents containing an image.

Figure 29:
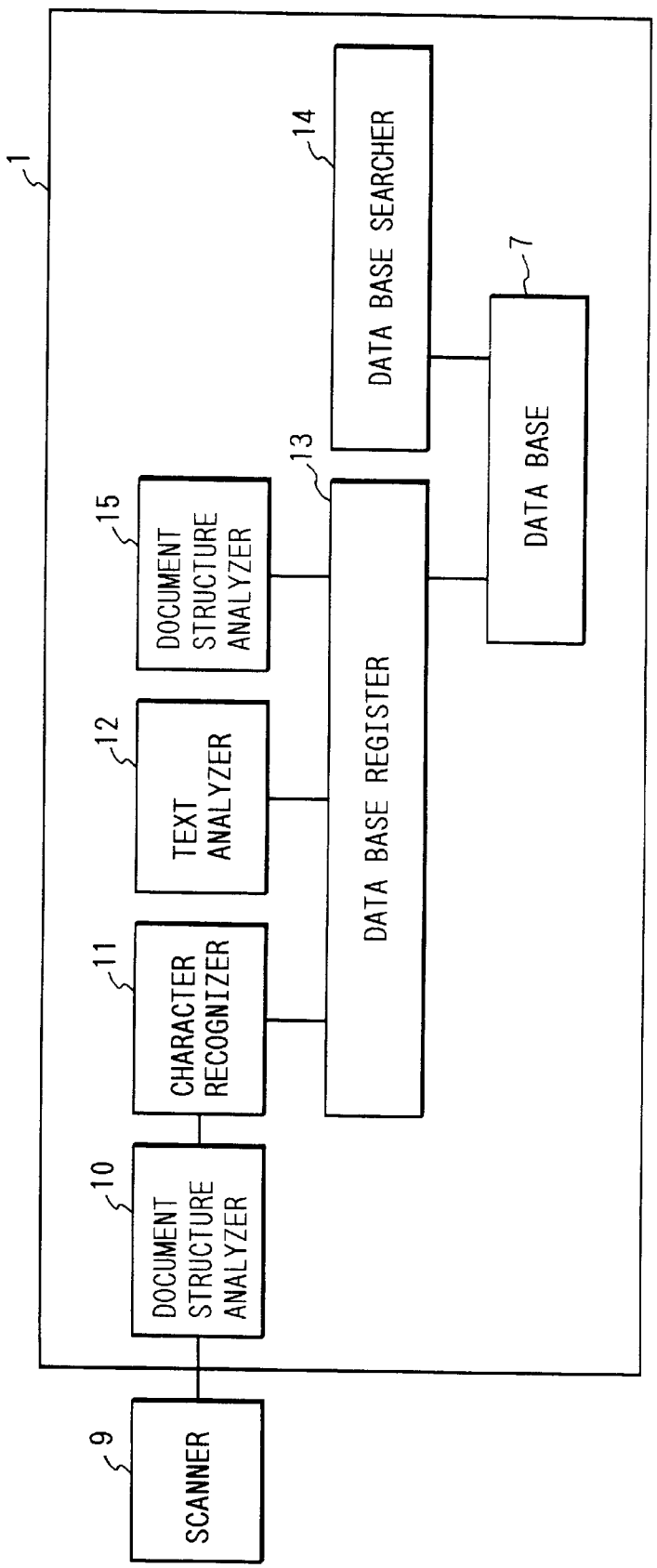
FIG. 29 is a view showing the configuration of a third embodiment of the present invention.

FIG. 29 is a block diagram of the third embodiment, wherein the document structure analyzing means 10 divides the document image, entered from the scanner 9, into a text area, an image area and a pattern area, then generates and sends the document layout information to the character recognition means 11 and generates a document image file. The character recognition means 11 effects character recognition on the text area, thereby generating text information, then correlates the text information, document layout information and document image file name and registers them in the data base 7. Document structure analyzing means 15 prepares a document image from the drawing codes, then generates the document layout information by analyzing the document image and effects registration in the data base by correlating the document layout information and the file name.

When the document layout information such as the paragraph layout information and the presence/absence of image is designated, the data base search means 14 searches the data base 7, based on thus designated document layout information and releases the corresponding document image file name or the file name.

The document structure analyzing means 15 may also be used for analyzing the document layout information directly from the drawing codes.

The present embodiment, being capable of search also by the document layout information, allows to search a document not containing a text or a document in which the character recognition is difficult.

Fourth embodiment

In the foregoing embodiment the electronic filing apparatus 1 and the scanner 9 are mutually connected, but there can be conceived a system in which the electronic filing apparatus and the scanner are separated and the data are transferred by a transportable memory device.

Figure 30:
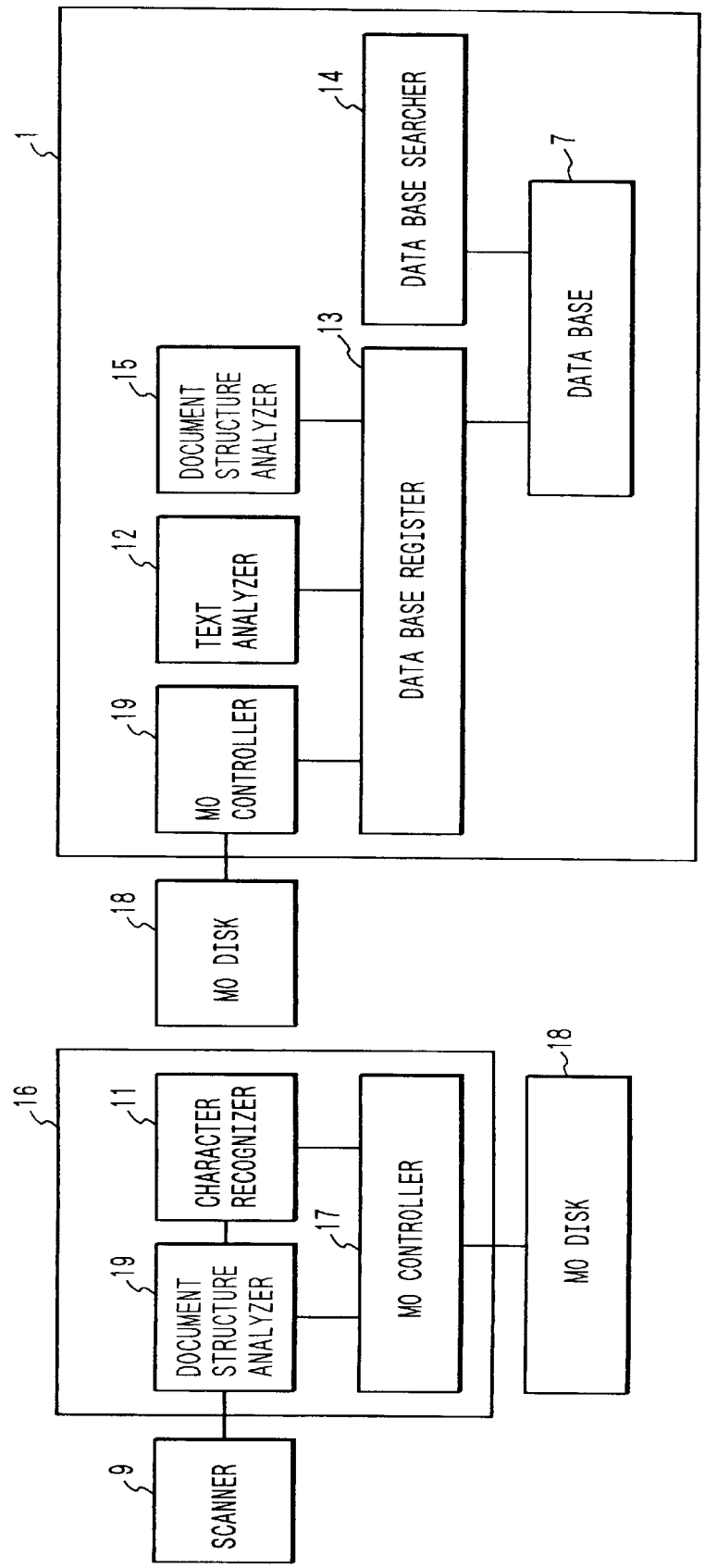
FIG. 30 is a view showing the configuration of a fourth embodiment of the present invention.

FIG. 30 is a block diagram of a fourth embodiment, in which an image processing apparatus 16 connected to a scanner 9 effects document structure analysis and character recognition on the document image entered by the scanner 9 and stores the data in a magnetooptical disk of a magnetooptical disk device 18 through a magnetooptical disk controller 17. The magnetooptical disk device 18 is connected to the electronic filing apparatus 1, which reads the data from said magnetooptical disk device through a magnetooptical disk controller 19 and requests the text information and the document layout information of the document image in the data base 7, by making correlation with the document image file name.

In the present embodiment, the scanner 19, being separated from the electronic filing apparatus 1, can be utilized in common by plural electronic filing apparatus.

Fifth embodiment

In the foregoing embodiments, the electronic filing apparatus 1 is directly connected to the scanner 9, but they may also be connected through a network.

Figure 31:
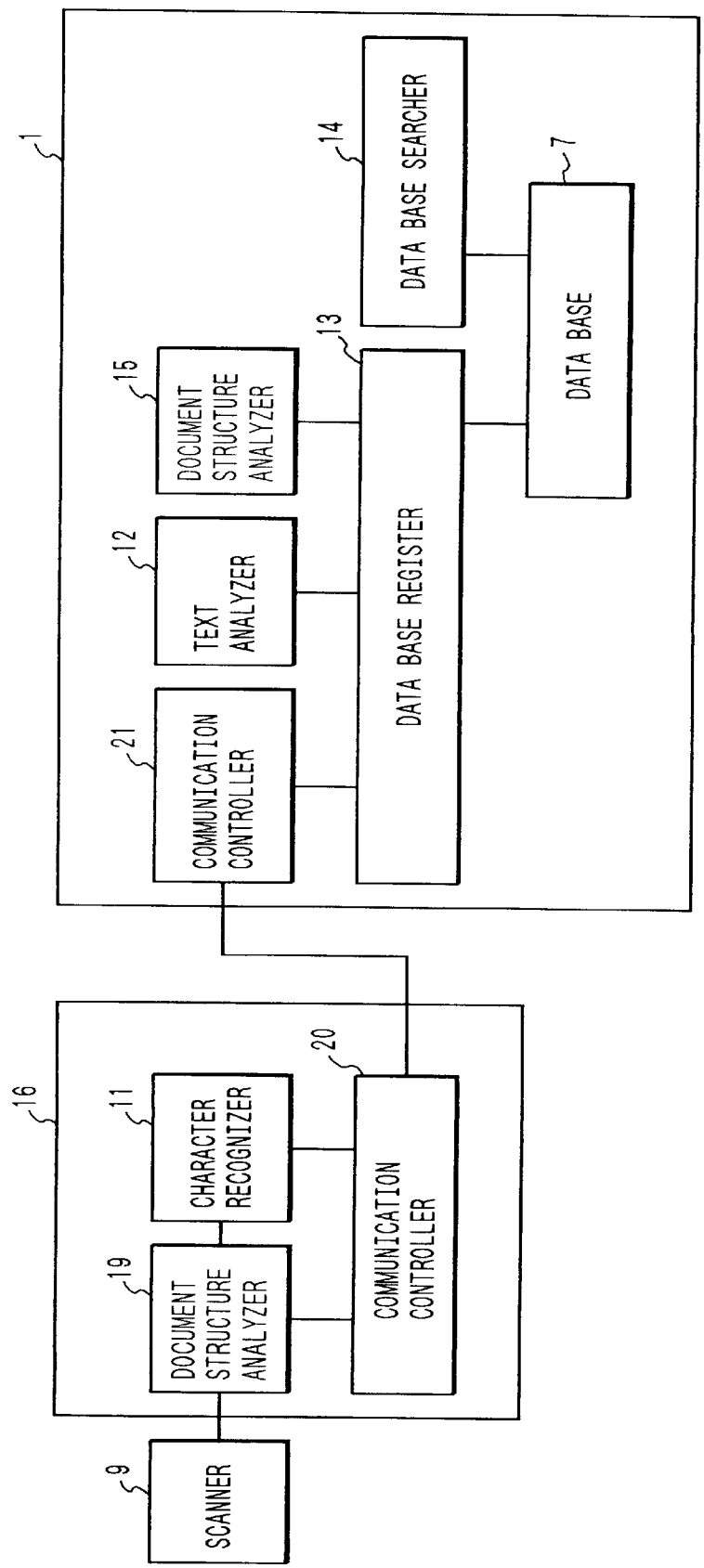
FIG. 31 is a view showing the configuration of a fifth embodiment of the present invention.

FIG. 31 is a block diagram of a fifth embodiment, wherein an image processing apparatus 16, provided with a scanner 9, is connected to an electronic filing apparatus 1 through a network, and communication is made by communication controllers 20, 21.

The present embodiment can be utilized even when the scanner 9 and the image processing apparatus are located mutually distant.

Sixth embodiment

In the foregoing embodiments, the electronic filing apparatus 1 is provided therein with the data base 7, but the data base may be connected through a network.

Figure 32:
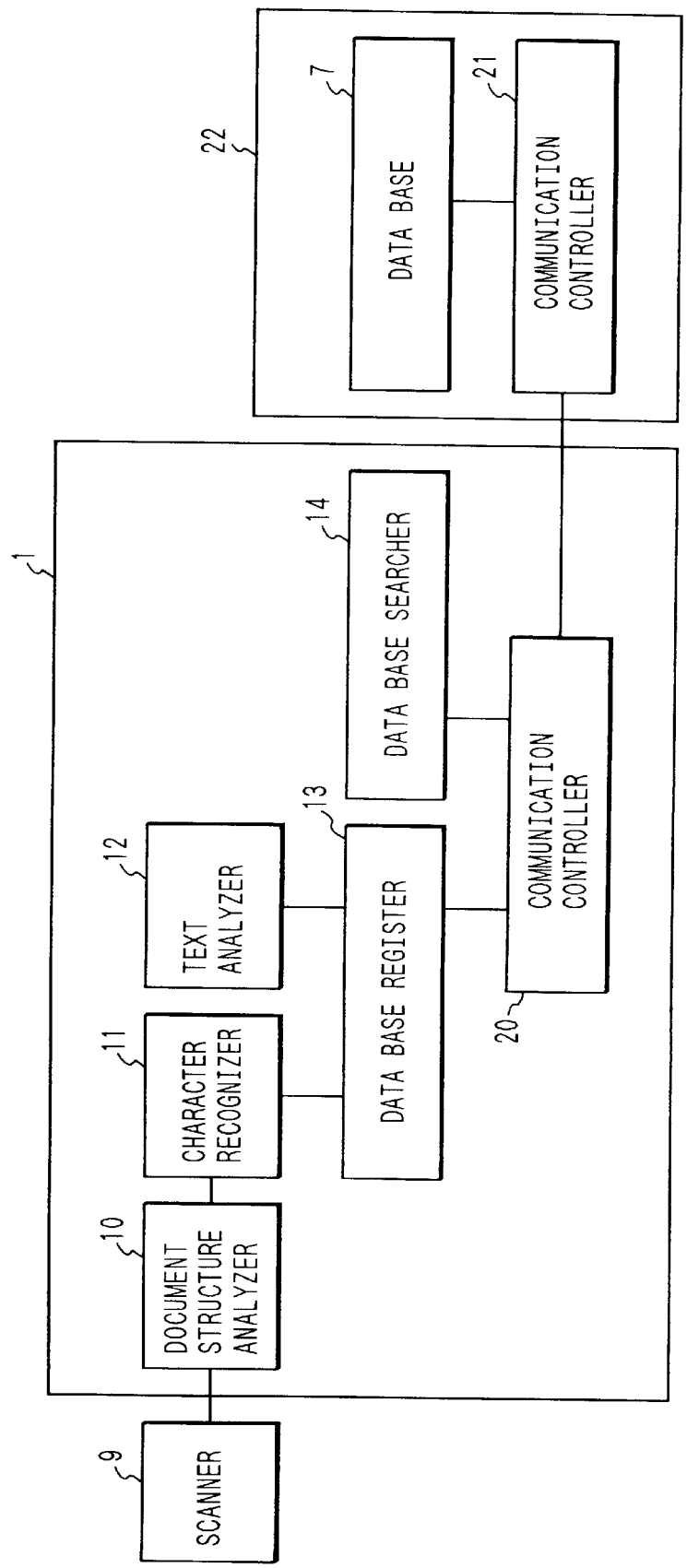
FIG. 32 is a view showing the configuration of a sixth embodiment of the present invention.

FIG. 32 is a block diagram of a sixth embodiment, wherein a computer 22 exclusive for the data base is connected with an electronic filing apparatus 1 through a network, and communication is made by communication controllers 20, 21. In the present embodiment, owing to such connection by the network, the data base-exclusive computer 22 can be utilized in common by plural electronic filing apparatus.

Seventh embodiment

In the foregoing embodiments, the data base search means 14 releases the document image file name or the file name, but there may instead be provided application activating means and, in case document information prepared by an ordinary application is searched, such application may be activated.

Figure 33:
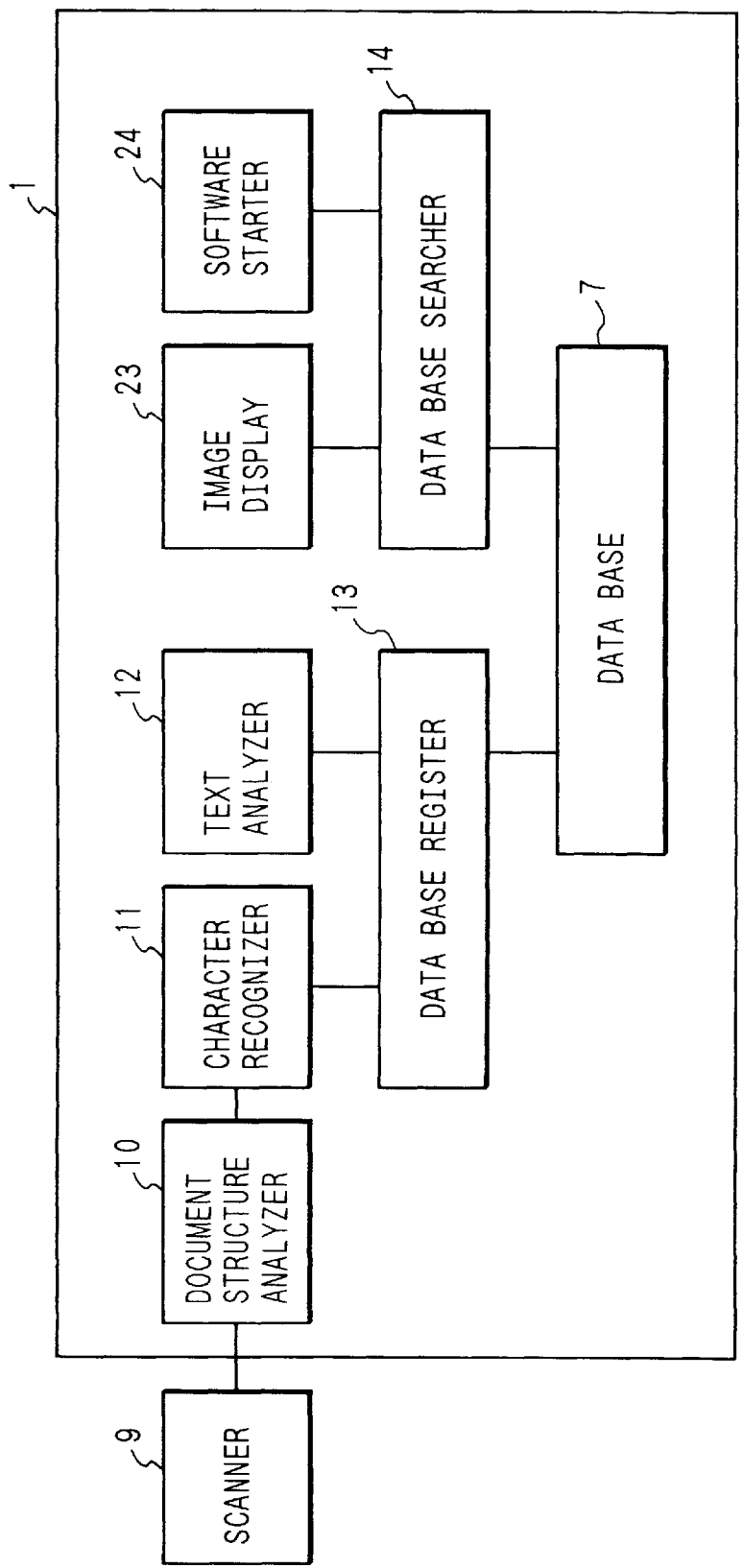
FIG. 33 is a view showing the configuration of a seventh embodiment of the present invention.

FIG. 33 is a block diagram of a seventh embodiment wherein provided are software activation means 24 for activating the application used in the generation of the document, and image display means 23 for displaying the document image entered by the scanner 9.

In the present embodiment, in case there is searched a document prepared by an ordinary application, said application is automatically activated to enable editing operation, and, in case there is searched a document image entered by the scanner, it is displayed for confirmation.

As explained in the foregoing, the present invention is featured by the presence of text analyzing means for generating text information by analyzing the document information prepared by the ordinary application and text information generating means for generating text information for the document image entered by the scanner, and by registration in correlation with said text information, whereby cumbersome operations can be dispensed with for the document prepared by such ordinary application. It is also rendered possible to effect text search with a high accuracy, and to effect search also for the document image entered by the scanner, with similar operations.

Also the present invention is featured by the presence of document layout analyzing means for generating the document layout information by analyzing the document information prepared by the ordinary application and document layout analyzing means for generating the document layout information by analyzing the document image entered by the scanner, and by registration in correlation with said document layout information, whereby the document prepared by the ordinary application can be searched with the document layout information. It is therefore rendered possible to search the document not containing text and the document image which is entered for example by the scanner and for which the character recognition is difficult, utilizing such document layout information.

In the following there will be explained an eighth embodiment of the present invention, with reference to the attached drawings.

Eighth embodiment

Figure 34:
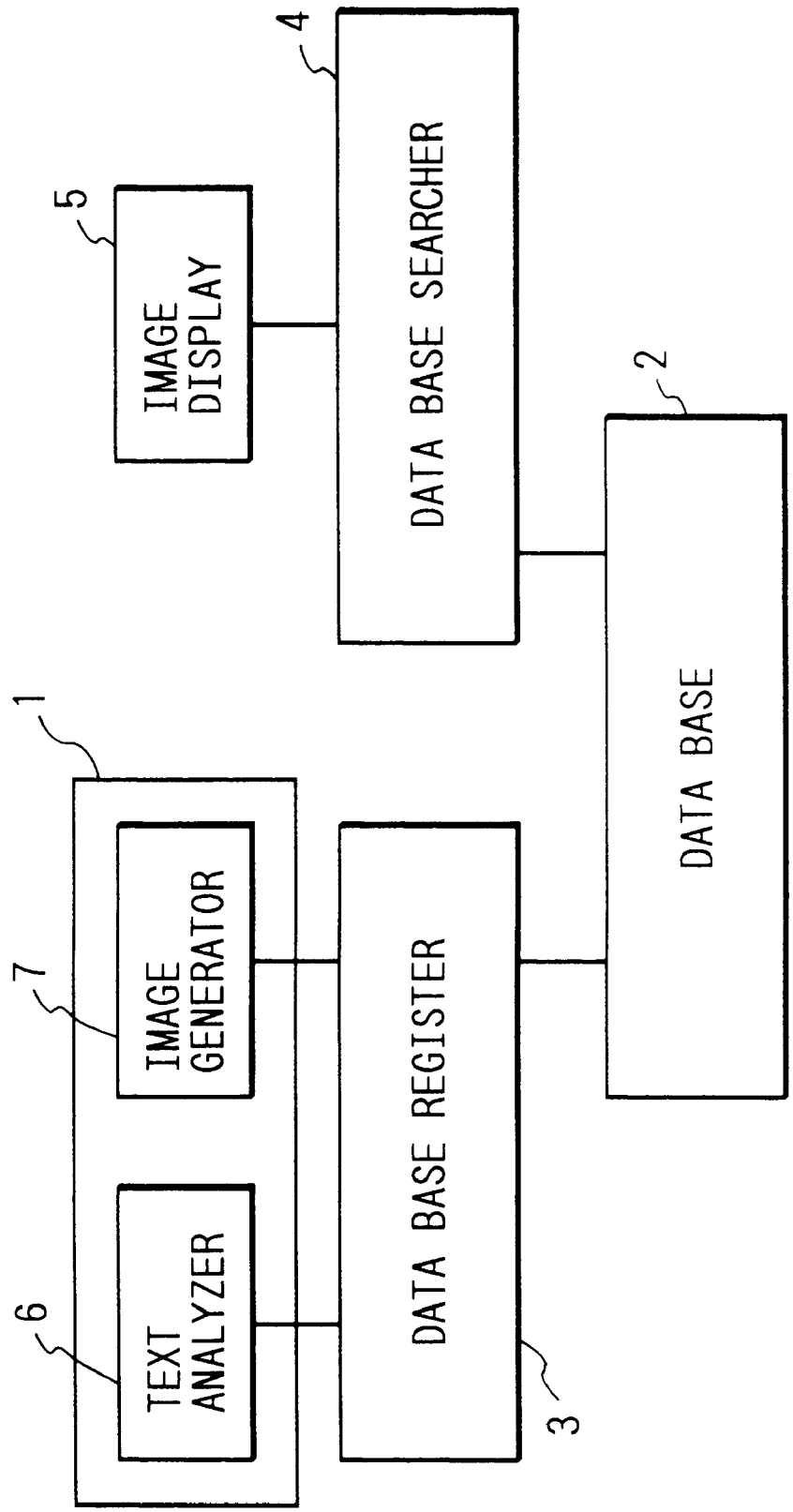
FIG. 34 is a block diagram of an eighth embodiment of the present invention.

FIG. 34 is a block diagram of an eighth embodiment of the electronic filing apparatus of the present invention, which is composed of text information processing means 1 for analyzing text information for document information prepared by a predetermined application software and generating a document image; a data base 2; data base registration means 3 for registering the text information and the document image information in the data base 2; data base search means 4 for effecting search of the text information on said data base 2; and image display means 5 for displaying a document image based on the text information searched by said data base search means 4.

Said text information processing means 1 is composed of text analyzing means 6 for analyzing text information, and image forming means 7 for forming a document image, and is activated in the predetermined application software by a process similar to that for printing.

More specifically, the text analyzing means 6 extracts text information, i.e., a character code, from the drawing code issued by the operating system (for example the GDI code in case of Microsoft Windows system). The image forming means 7 forms the document image from said drawing code. The text information and the document image are registered in the data base, in correlation with the file name prepared by said application software, by said data base registration means 3. The data base search means 4, upon receiving designation of a character train from the operator, effects search on all the text information registered in the data base and releases the document image and the file name correlated with the text information containing said designated character train and effects display on said image display means 5.

Figure 35:
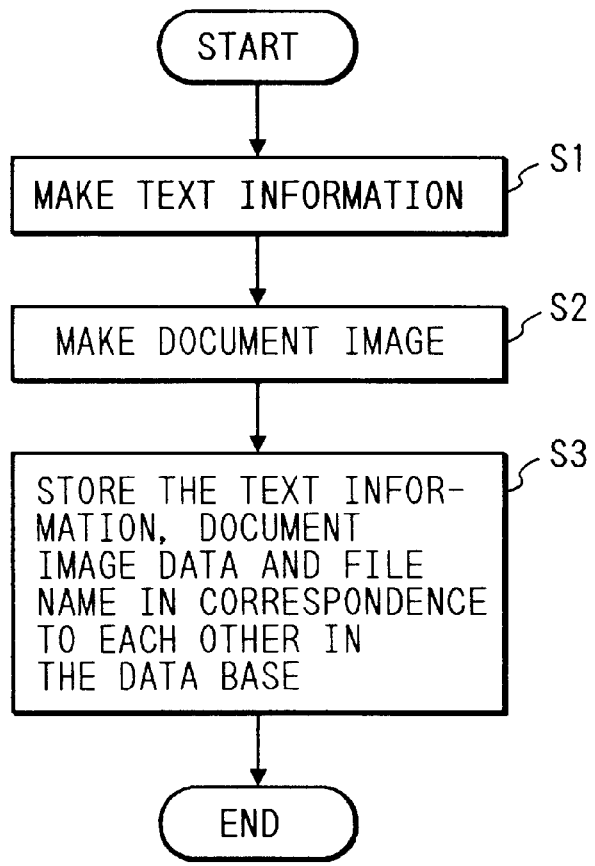
FIGS. 35 and 36 are flow charts showing the control sequence of an electronic filing method of the present invention.

FIG. 35 is a flow chart showing the process of registration in the data base 2 by the text information processing means 1.

In a step S1, the text analyzing means 6 analyzes the drawing code to generate text information, and a step S2 generates a document image by the image forming means 7. In a step S3, the data base registration means 3 effects registration in the data base 2 by correlating the text information, the document image data and the file name, and the process is terminated.

Figure 36:
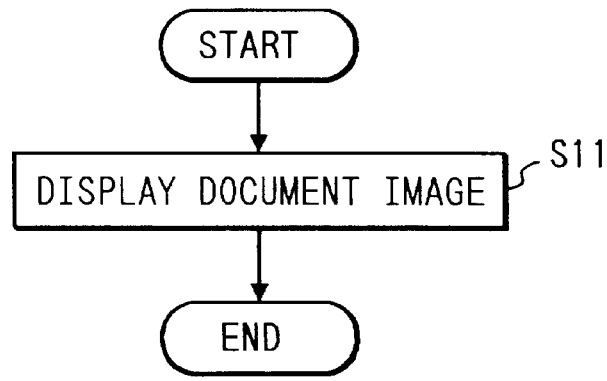

FIG. 36 is a flow chart showing the function of the image display means 5, wherein a step S11 displays the document image by the image display means 5 and the process is then terminated.

As explained in the foregoing, the eighth embodiment of the present invention avoids cumbersome operations, as the operator can register the document information by merely effecting a process similar to the printing operation and activating the text analyzing means 6. Also, as the search of the text information is conducted on the entire text in the document information, the document containing the designated character train can be securely searched. Furthermore, as the document image is displayed according to the result of search, it is rendered possible to confirm the content of the document in a simpler manner and in speedier manner, in comparison with the case of search by activating the application software used in the preparation of the document information. Particularly in case plural documents are found by the search, it is difficult to simultaneously activate plural application softwares, but the present eighth embodiment can simultaneously display plural document images, so that the desired document can be easily confirmed. Furthermore, such document display facilitates search and confirmation of the document, even in an apparatus which cannot use the application software used in the preparation of the document image or for an operator who cannot operate such application software.

Ninth embodiment

Figure 37:
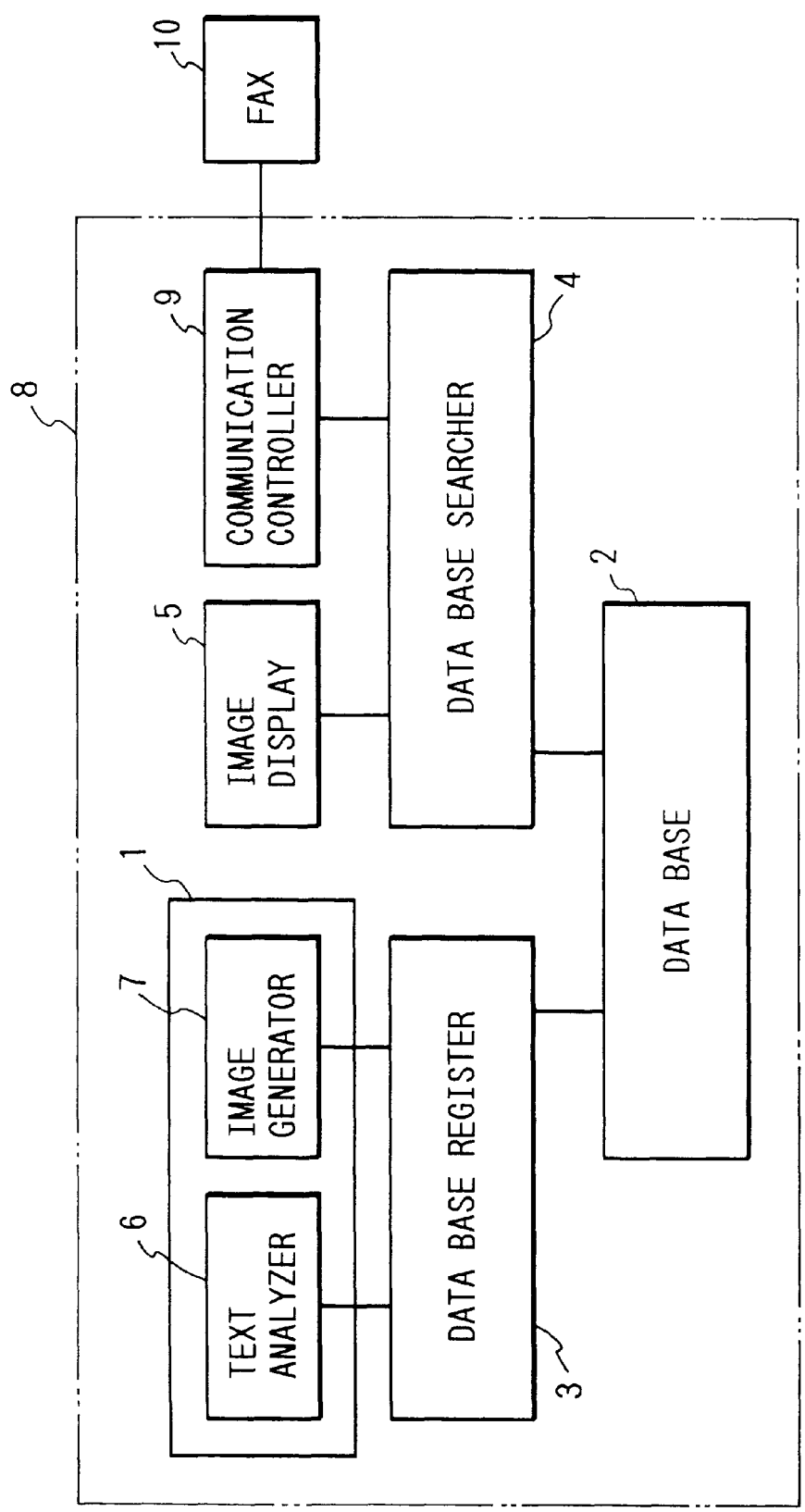
FIG. 37 is a block diagram of a ninth embodiment of the present invention.

FIG. 37 is a block diagram of a ninth embodiment, in which the electronic filing apparatus 8 is provided, in addition to the configuration of the eighth embodiment, with communication control means and is connected to a facsimile apparatus 10.

The ninth embodiment enables transmission of a document image to a distant location through a communication line such as a public telephone network, by the facsimile apparatus 10 connected to the communication control means 9.

In the present ninth embodiment, as the document image is already formed by the image forming means 7, it can be immediately transmitted to the distant location by the facsimile apparatus 10, based on the document information obtained by the search.

Tenth embodiment

Figure 38:
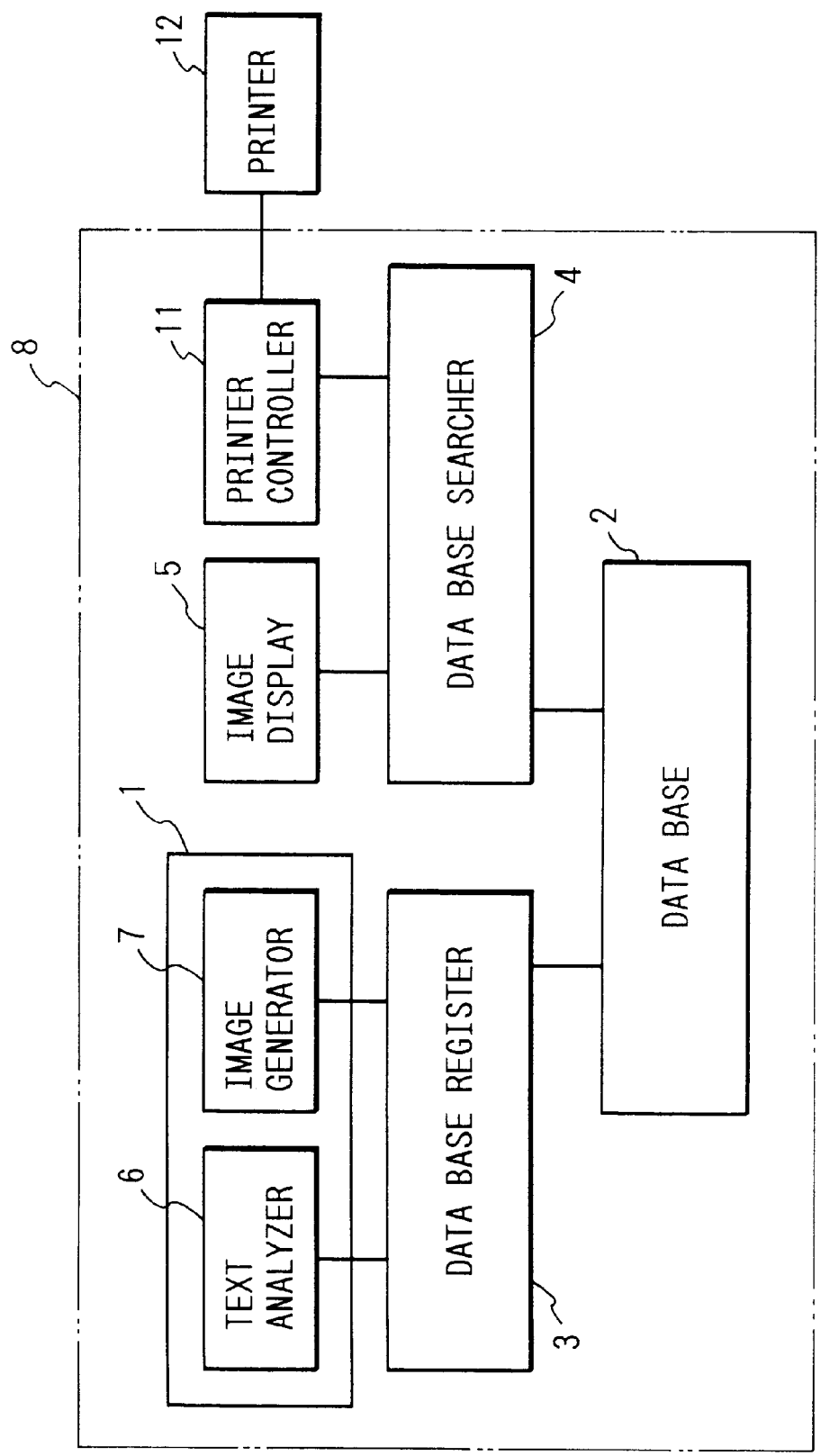
FIG. 38 is a block diagram of a tenth embodiment of the present invention.

FIG. 38 is a block diagram of a tenth embodiment, wherein the electronic filing apparatus 8 is provided, in addition to the configuration of the eighth embodiment, with printer control means 11 connected to a printer 12.

In the tenth embodiment, as the document image is already formed by the image forming means 7, it can be immediately printed by the printer 12, based on the document information obtained by the search.

Eleventh embodiment

Figure 39:
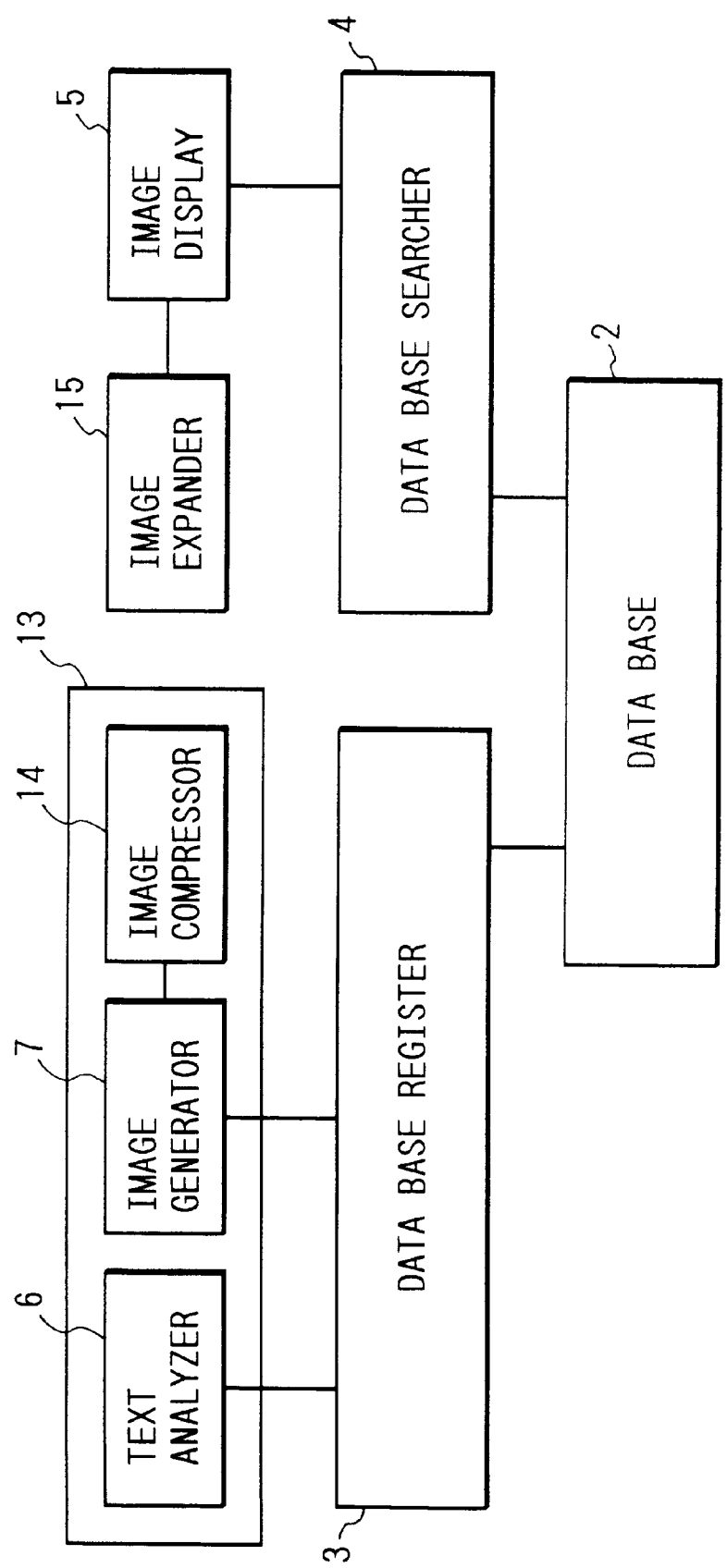
FIG. 39 is a block diagram of an eleventh embodiment of the present invention.

FIG. 39 is a block diagram of an eleventh embodiment of the electronic filing apparatus, wherein the document process information means 13 is provided with image compression means 14 for hierarchic image compression, in addition to the text analyzing means 6 and the image forming means 7, and there is further provided image expansion means 15 for expanding the image, compressed by said image compression means 14, for display on the image display means 5. The hierarchic compression of the image can be achieved by a standardized still image encoding, such as IBIG or JPEG, to obtain an image compressed to 1/4, 1/16, 1/64 etc. in area ratio.

The present eleventh embodiment can reduce the required image capacity, as the image data can be registered in the data base 2 by the data base registration means 3, after said compression. It is also possible to confirm the result of search in simple and speedy manner, for example by displaying the document images in a large or small size respectively when few or many images are found in the search.

Twelfth Embodiment

Figure 40:
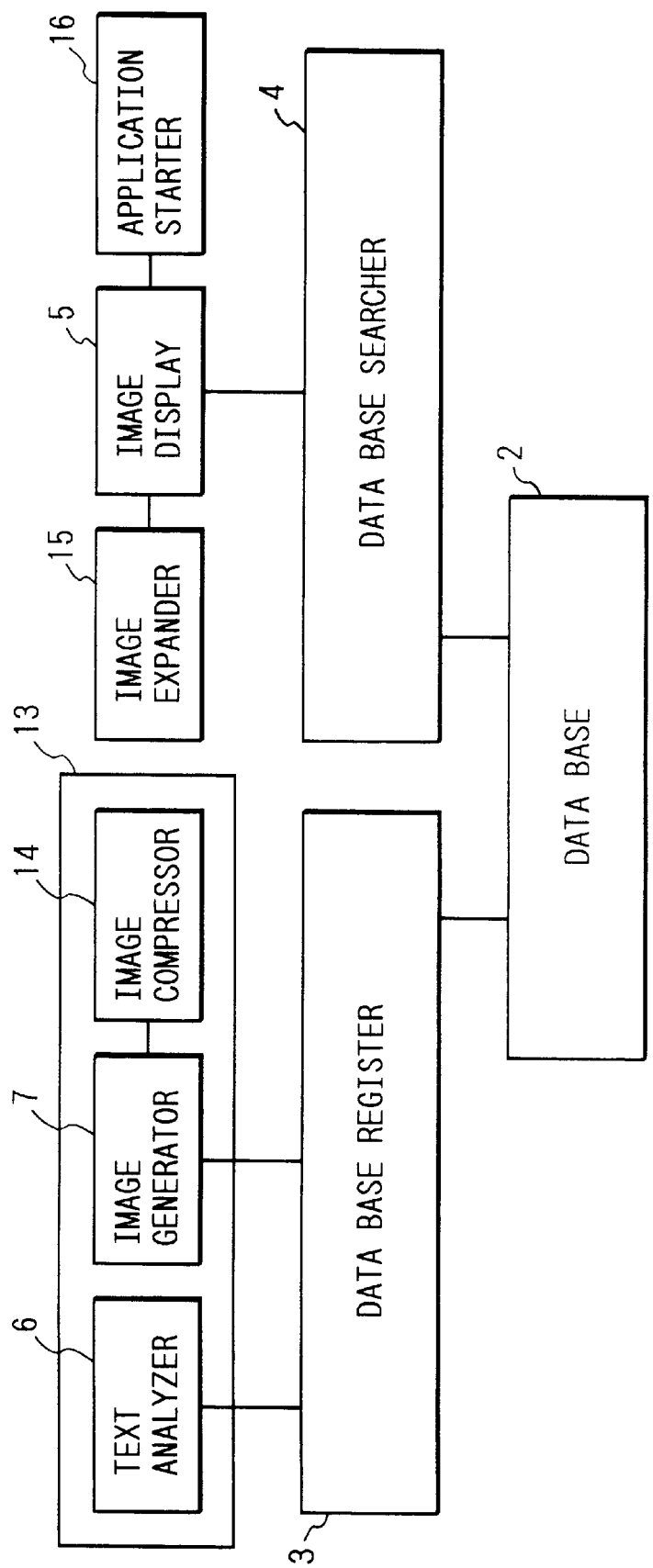
FIG. 40 is a block diagram of a twelfth embodiment of the present invention.

FIG. 40 is a block diagram of a twelfth embodiment, in which the electronic filing apparatus is provided, in addition to the configuration of the eleventh embodiment, with application starting means 16 for activating the application software used in the preparation of the document information.

The present twelfth embodiment allows to confirm the result of search by the image display and to edit the searched document image by activating the application software. For example there may be provided, in the displayed menu, an "editing" button, which can be clicked by the operator to activate said application software.

Thirteenth embodiment

Figure 41:
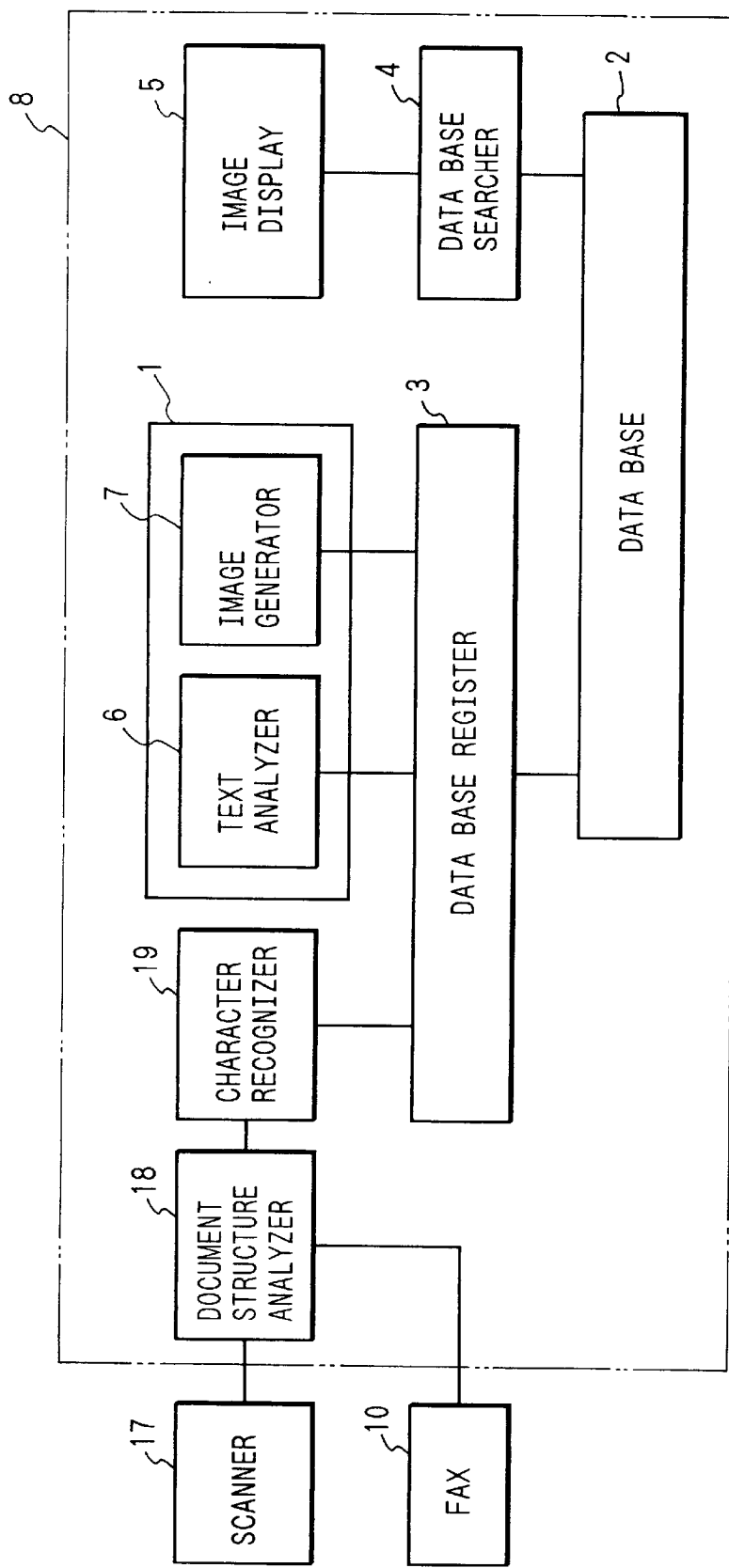
FIG. 41 is a block diagram of a thirteenth embodiment of the present invention.

FIG. 41 is a block diagram of a thirteenth embodiment, in which the electronic filing apparatus 8 is provided with document structure analyzing means 18 for analyzing the structure of a document image entered from the scanner 17 or received from the facsimile apparatus 10, and character recognition means 19 for generating text information or character codes, by recognizing characters analyzed by said document structure analyzing means 18.

The document structure analyzing means 18 divides the document image entered by the scanner 17 or received by the facsimile apparatus 10 into the text area, graphic area, image area etc. and sends the text area to the character recognition means 19. The data base registration means 3 effects registration in the data base 2, by correlating the character code train and the document image data.

In the thirteenth embodiment explained above, the operator can effect search and confirmation of the document image, without considering whether the document has been either prepared by an application software or received by the facsimile apparatus 10.

Fourteenth embodiment

Figure 42:
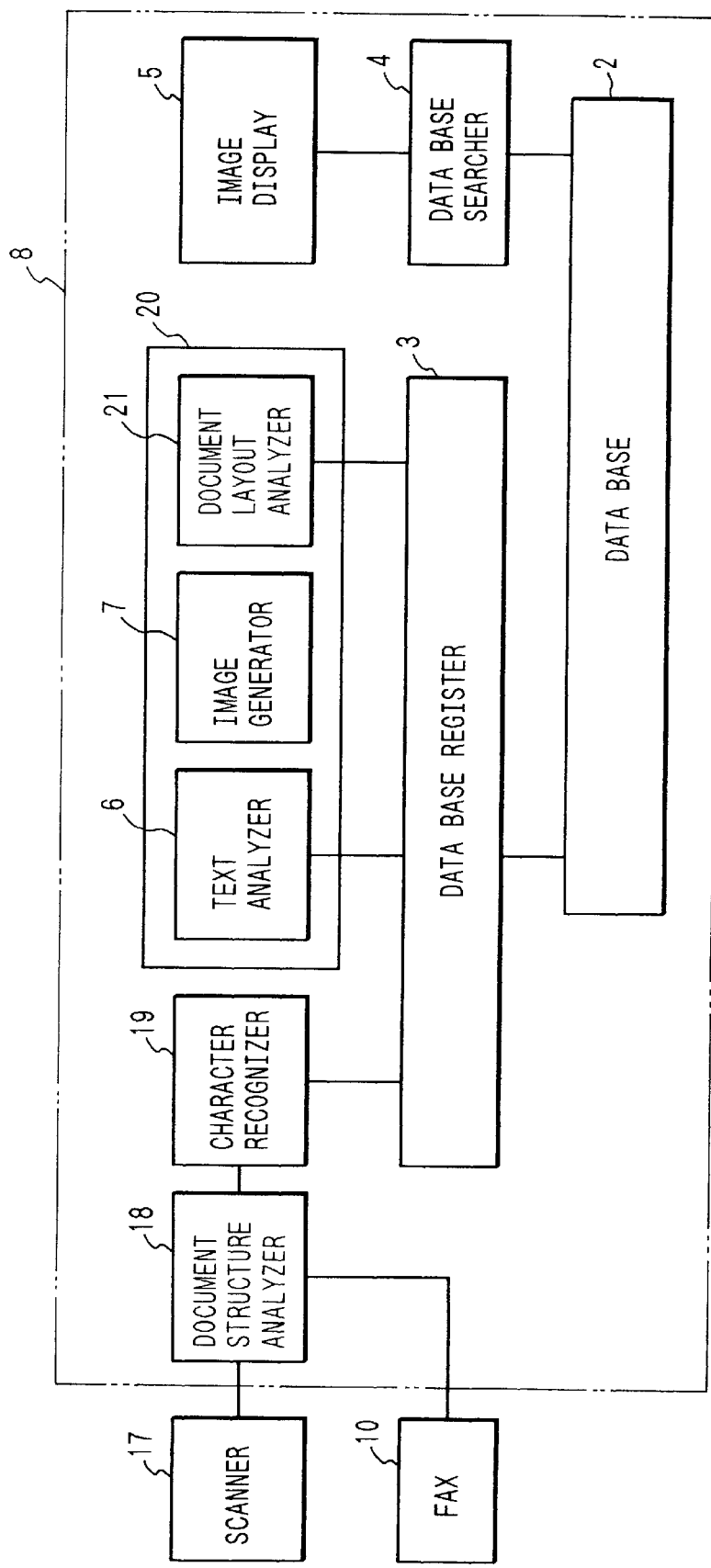
FIG. 42 is a block diagram of a fourteenth embodiment of the present invention.

FIG. 42 is a block diagram of a fourteenth embodiment, in which the electronic filing apparatus 8 is provided, in addition to the configuration of the thirteenth embodiment, with document layout analyzing means 21 in the document information process means. Said document layout analyzing means can register or search document layout information, representing the paragraphs, presence or absence of an image or a graphic pattern, with respect to the document image, generated from the document information prepared by a predetermined application software.

It is thus rendered possible to easily search or confirm even a document without text information.

As explained in the foregoing, the electronic filing apparatus and method of the present invention allow precise search for the document, prepared by the predetermined application software, in the data base without any cumbersome operation, and also enable search and confirmation of the desired document in a speedy and simple manner, by the display of the document image. It is also rendered possible to simultaneously confirm plural documents, and it is no longer necessary to activate the application software for the purpose of confirmation, so that the desired document can be confirmed even for an apparatus which cannot activate the application software.

It is furthermore possible to transmit the desired document by facsimile or to print it on the printer, so that various uses are possible according to the purpose.

Furthermore, the use of the image compression means and the image expansion means allows to minimize the memory capacity required for registration in the data base. Also the document images can be displayed in different sizes according to the necessity, whereby the desired document can be confirmed in simple and speedy manner.

Furthermore, after the confirmation of the desired document, there may be conducted editing or renewal of the document by activating the corresponding application software.

Furthermore, the search and confirmation of the document image can be achieved by the same operation, without differentiating the document image prepared by an application software and that obtained from the image input means or the facsimile transmission, by extracting the text area from the document image entered by the image input means or received by the facsimile apparatus, and generating text information through character recognition of said text area.

Furthermore, it is rendered possible to search and confirm even a document not containing text information, by analyzing the layout of the document information prepared by said application software, and the use of the image compression means allows to vary the form of display according to the condition or result of search, and to achieve confirmation of the document in a speedy and simple manner.

What is claimed is:

1. An electronic filing apparatus comprising:

conversion means for converting first data made with a first application program into drawing commands for printing, wherein the drawing commands can be processed with a second, other application program different from the first application program; and storing means for storing the drawing commands as accumulated data corresponding to the first data.

2. An electronic filing apparatus according to claim 1, further comprising means for converting a drawing command for printing into a format suitable for document accumulation.

3. An electronic filing apparatus according to claim 1, further comprising means for extracting and storing information for keyword search.

4. An electronic filing apparatus comprising:

conversion means for converting first data made with a first application program into drawing commands for printing, wherein the drawing commands can be processed with a second, other application program different from the first application program;

storing means for storing the drawing commands as accumulated data corresponding to the first data;

means for dividing the accumulated data stored in said storing means into groups, according to a feature of the accumulated data; and means for effecting optimum compression to each of the groups of accumulated data, wherein the compressed groups of accumulated data are accumulated in a data base.

5. An electronic filing apparatus according to claim 4, wherein the data is divided into groups corresponding to a character portion, a vector drawing portion and a bit map image portion.

6. An electronic filing apparatus according to claim 5, further comprising:

means for recognizing and encoding a bit map image pattern within the data, said bit map being encoded into a plurality of codes including at least one character code, wherein an encoded character code is processed in the same manner as said character portion.

7. An electronic filing apparatus comprising:

conversion means for converting first data made with a first application program into drawing commands for printing, wherein the drawing commands can be processed with a second, other application program different from the first application program;

storing means for storing the drawing commands as accumulated data corresponding to the first data; and means for extracting a title portion from the drawing commands stored in said storing means, wherein said extracted title portion is registered as key information for search.

8. An electronic filing apparatus according to claim 7, wherein said title portion indicates presence or absence of a title.

9. An electronic filing apparatus according to claim 7, wherein said title portion is code information obtained by recognition of a title.

10. An electronic filing apparatus according to claim 7, further comprising means for dividing the drawing commands according to a feature thereof.

11. An electronic filing apparatus according to claim 7, wherein the drawing commands are divided into a character portion, a vector drawing portion and a bit map image portion.

12. An electronic filing apparatus comprising:

conversion means for converting first data made with a first application program into drawing commands for printing, wherein the drawing commands can be processed with a second, other application program different from the first application program;

storing means for storing the drawing commands as accumulated data corresponding to the first data; and means for extracting a table portion from the drawing commands stored in said storing means, wherein said extracted table portion is registered as key information for search.

13. An electronic filing apparatus according to claim 12, wherein said table portion indicates presence or absence of a table.

14. An electronic filing apparatus according to claim 12, wherein said table portion indicates the number of columns constituting a table.

15. An electronic filing apparatus according to claim 12, further comprising means for dividing the drawing commands according to a feature thereof.

16. An electronic filing apparatus according to claim 15, wherein the drawing commands are divided into a character portion, a vector drawing portion and a bit map image portion.

17. An electronic filing apparatus comprising:

conversion means for converting first data made with a first application program into drawing commands for printing, wherein the drawing commands can be processed with a second, other application program different from the first application program;

storing means for storing the drawing commands as accumulated data corresponding to the first data; and means for extracting a graph portion from the drawing commands stored in said storing means, wherein said extracted graph portion is registered as key information for search.

18. An electronic filing apparatus according to claim 17, wherein said graph portion indicates presence or absence of a graph.

19. An electronic filing apparatus according to claim 17, further comprising means for dividing the drawing commands according to a feature thereof.

20. An electronic filing apparatus according to claim 19, wherein the drawing commands are divided into a character portion, a vector drawing portion and a bit map image portion.

21. An electronic filing apparatus comprising:

conversion means for converting first data made with a first application program into drawing commands for printing, wherein the drawing commands can be processed with a second, other application program different from the first application program;

storing means for storing the drawing commands as accumulated data corresponding to the first data; and means for extracting a bit map image portion from the drawing commands stored in said storing means, wherein said extracted bit map image portion is registered as key information for search.

22. An electronic filing apparatus according to claim 21, wherein said bit map image portion indicates presence or absence of a bit map image.

23. An electronic filing apparatus according to claim 21, wherein said bit map image portion indicates the number of bit map images.

24. An electronic filing apparatus according to claim 21, further comprising means for dividing the drawing commands according to a feature thereof.

25. An electronic filing apparatus according to claim 24, wherein the drawing commands are divided into a character portion, a vector drawing portion and a bit map image portion.

26. An electronic filing apparatus comprising:

a computer system structured to process file information of a text, a table and an image prepared and/or edited by plural application programs activatable by said computer system based on a predetermined operating system;

printer driver means for converting drawing information, transmitted from a first one of the application programs, into drawing commands for printing, wherein the drawing commands can be processed with a second, other one of the application programs different from the first application program;

storing means for storing the drawing commands as accumulated data corresponding to the drawing information;

conversion means for converting the drawing commands converted by said printer driver means and stored in said storing means, into a common document file format which can be directly referenced by each of said plural application programs; and memory means for storing a common file, according to said common document file format converted by said conversion means.

27. An electronic filing apparatus according to claim 26, further comprising:

a search driver for effecting search, through said conversion means, of the common file of the common document file format stored in said memory means, wherein said search driver can be incorporated in said computer system as a general-use driver for said application programs.

28. An electronic filing apparatus according to claim 26, wherein said printer driver means is adapted to analyze the drawing commands and to divide them into a character portion, a vector drawing portion, a bit map image portion and a halftone image portion and to generate compressed data from the divided portions.

29. An electronic filing apparatus according to claim 28, further comprising:

optical character recognition means for analyzing the bit map image portion and the halftone image portion divided by said printer driver means, and recognizing and extracting character information added to the divided character portion.

30. An electronic filing system comprising a plurality of electronic filing apparatuses, each of which includes:

a computer system capable of processing file information of a text, a table and an image prepared and/or edited by plural application programs activatable by said computer system based on a predetermined operating system;

printer driver means for converting drawing information, transmitted from a first one of the application programs, into drawing commands for printing, wherein the drawing commands can be processed with a second, other one of the application programs different from the first application program;

storing means for storing the drawing commands as accumulated data corresponding to the drawing information;

conversion means for converting the drawing commands converted by said printer driver means and stored in said storing means, into a common document file format which can be directly referenced by each of said plural application programs; and memory means for storing a common file, according to said common document file format converted by said conversion means, wherein a plurality of said electronic filing apparatuses are connected by a predetermined network.

31. An electronic filing method comprising:

the step of converting first data made with a first application program into drawing commands for printing, wherein the drawing commands can be processed with a second, other application program different from the first application program; and the step of storing the drawing commands as accumulated data corresponding to the first data.

32. An electronic filing method according to claim 31, further comprising a step of converting a drawing command for printing into a format suitable for document accumulation.

33. An electronic filing method according to claim 31, further comprising a step of extracting and storing information for keyword search.

34. An electronic filing method comprising the steps of:

converting first data made with a first application program into drawing commands for printing, wherein the drawing commands can be processed with a second, other application program different from the first application program;

storing the drawing commands as accumulated data corresponding to the first data;

dividing the accumulated data stored in said storing step into groups, according to a feature of the accumulated data; and effecting optimum compression to each of the groups of accumulated data;

wherein the compressed groups of accumulated data are accumulated in a data base.

35. An electronic filing method according to claim 34, wherein the data is divided into groups corresponding to a character portion, a vector drawing portion and a bit map image portion.

36. An electronic filing method according to claim 35, further comprising the steps of:

recognizing and encoding a bit map image pattern within the data, the bit map being encoded into a plurality of codes including at least one character code, wherein an encoded character code is processed in the same manner as the character portion.

37. An electronic filing method comprising the steps of:

converting first data made with a first application program into drawing commands for printing, wherein the drawing commands can be processed with a second, other application program different from the first application program;

storing the drawing commands as accumulated data corresponding to the first data; and extracting a title portion from the drawing commands stored in said storing step, wherein the extracted title portion is registered as key information for search.

38. An electronic filing method according to claim 37, wherein the title portion indicates presence or absence of a title.

39. An electronic filing method according to claim 37, wherein the title portion is code information obtained by recognition of a title.

40. An electronic filing method according to claim 37, further comprising a step of dividing the drawing commands according to a feature thereof.

41. An electronic filing method according to claim 37, wherein the drawing commands are divided into a character portion, a vector drawing portion or a bit map image portion.

42. An electronic filing method comprising the steps of:

converting first data made with a first application program into drawing commands for printing, wherein the drawing commands can be processed with a second, other application program different from the first application program;

storing the drawing commands as accumulated data corresponding to the first data; and extracting a table portion from the drawing commands stored at said storing step, wherein the extracted table portion is registered as key information for search.

43. An electronic filing method according to claim 42, wherein the table portion indicates presence or absence of a table.

44. An electronic filing method according to claim 42, wherein the table portion indicates the number of columns constituting a table.

45. An electronic filing method according to claim 42, further comprising a step of dividing the drawing commands according to a feature thereof.

46. An electronic filing method according to claim 45, wherein the drawing commands are divided into a character portion, a vector drawing portion and a bit map image portion.

47. An electronic filing method comprising the steps of:

converting first data made with a first application program into drawing commands for printing, wherein the drawing commands can be processed with a second, other application program different from the first application program;

storing the drawing commands as accumulated data corresponding to the first data; and extracting a graph portion from the drawing commands stored in said storing means;

wherein said extracted graph portion is registered as key information for search.

48. An electronic filing method according to claim 47, wherein the graph portion indicates presence or absence of a graph.

49. An electronic filing method according to claim 47, further comprising a step of dividing the drawing commands according to a feature thereof.

50. An electronic filing method according to claim 49, wherein the drawing commands are divided into a character portion, a vector drawing portion and a bit map image portion.

51. An electronic filing method comprising the steps:

converting first data made with a first application program into drawing commands for printing, wherein the drawing commands can be processed with a second, other application program different from the first application program;

storing the drawing commands as accumulated data corresponding to the first data; and extracting a bit map image portion from the drawing commands stored at said storing step;

wherein the extracted bit map image portion is registered as key information for search.

52. An electronic filing method according to claim 51, wherein the bit map image portion indicates presence or absence of a bit map image.

53. An electronic filing method according to claim 51, wherein the bit map image portion indicates the number of bit map images.

54. An electronic filing method according to claim 51, further comprising a step of dividing the drawing commands according to a feature thereof.

55. An electronic filing method according to claim 54, wherein the drawing commands are divided into a character portion, a vector drawing portion and a bit map image portion.

56. An electronic filing method usable on a computer system structured to process file information of a text, a table and an image prepared and/or edited by plural application programs activatable by the computer system based on a predetermined operating system, said method comprising the steps of:

converting, by printer driver means, drawing information, transmitted from a first one of the application programs, into drawing commands for printing, wherein the drawing commands can be processed with a second, other one of the application programs different from the first application program;

storing the drawing commands as accumulated data corresponding to the drawing information;

converting the drawing commands converted by the printer driver means and stored at said storing step, into a common document file format which can be directly referenced by each of the plural application programs; and storing a common file, according to converted common document file format, in memory means.

57. An electronic filing method according to claim 56, further comprising the steps of:

effecting a search of the common file of the common document file format stored in the memory means, wherein the search can be executed in the computer system by a general-use driver for the application programs.

58. An electronic filing method according to claim 56, wherein the printer driver means is adapted to analyze the drawing and to divide them into a character portion, a vector drawing portion, a bit map image portion and a halftone image portion and to generate compressed data from the divided portions.

59. An electronic filing method according to claim 58, further comprising the steps of:

analyzing, by optical character recognition means, the bit map image portion and the halftone image portion divided by the printer driver means, and recognizing and extracting character information added to the divided character portion.

60. A method for use on an electronic filing system comprising a plurality of electronic filing apparatus, each of which includes a computer system capable of processing file information of a text, a table and an image prepared and/or edited by plural application programs activatable by the computer system based on a predetermined operating system, said method comprising the steps of:

converting, by printer driver means, drawing information, transmitted from a first one of the application programs, into drawing commands for printing, wherein the drawing commands can be processed with a second, other one of the application programs different from the first application program;

storing the drawing commands as accumulated data corresponding to the drawing information;

converting the drawing commands converted by the printer driver means and stored at said storing step, into a common document file format which can be directly referenced by each of the plural application programs; and storing a common file, according to the converted common document file format, in memory means, wherein a plurality of the electronic filing apparatuses are connected by a predetermined network.

61. A computer-usable medium storing computer-usable instructions for causing a program-controlled electronic filing apparatus to convert first data made with a first application program into drawing commands for printing, wherein the drawing commands can be processed with a second, other application program different from the first application program, and to store the drawing commands as accumulated data corresponding to the first data.

62. A computer-usable medium according to claim 61, the instructions further comprising instructions for causing the apparatus to convert a drawing command for printing into a format suitable for document accumulation.

63. A computer-usable medium according to claim 61, the instructions further comprising instructions for causing the apparatus to extract and store information for keyword search.

64. A computer-usable medium storing computer-usable instructions for causing a program-controlled electronic filing apparatus to:

convert first data made with a first application program into drawing commands for printing, wherein the drawing commands can be processed with a second, other application program different from the first application program;

store the drawing commands as accumulated data corresponding to the first data;

divide the accumulated data stored in said storing step into groups, according to a feature of the accumulated data; and effect optimum compression to each of the groups of accumulated data, wherein the compressed groups of accumulated data are accumulated in a data base.

65. A computer-usable medium according to claim 64, wherein the data is divided into groups corresponding to a character portion, a vector drawing portion and a bit map image portion.

66. A computer-usable medium according to claim 65, the instructions further comprising instructions for causing the apparatus to:

recognize and encode a bit map image pattern within the data, the bit map being encoded into a plurality of codes including at least one character code, wherein an encoded character code is processed in the same manner as the character portion.

67. A computer-usable medium storing computer-usable instructions for causing a program-controlled electronic filing apparatus to:

convert first data made with a first application program, into drawing commands for printing, wherein the drawing commands can be processed with a second, other application program different from the first application program;

store the drawing commands as accumulated data corresponding to the first data; and extract a title portion from the drawing commands stored in said storing instruction;

wherein the extracted title portion is registered as key information for search.

68. A computer-usable medium according to claim 67, wherein the title portion indicates presence or absence of a title.

69. A computer-usable medium according to claim 67, wherein the title portion is code information obtained by recognition of a title.

70. A computer-usable medium according to claim 67, the instructions further comprising instructions for causing the apparatus to divide the drawing commands according to a feature thereof.

71. A computer-usable medium according to claim 67, wherein the drawing commands are divided into a character portion, a vector drawing portion or a bit map image portion.

72. A computer-usable medium storing computer-usable instructions for causing a program-controlled electronic filing apparatus to:

convert first data made with a first application program into drawing commands for printing, wherein the drawing commands can be processed with a second, other application program different from the first application programs;

store the drawing commands as accumulated data corresponding to the first data; and extract a table portion from the drawing commands stored at said storing instruction, wherein the extracted table portion is registered as key information for search.

73. A computer-usable medium according to claim 72, wherein the table portion indicates presence or absence of a table.

74. A computer-usable medium according to claim 72, wherein the table portion indicates the number of columns constituting a table.

75. A computer-usable medium according to claim 72, the instructions further comprising instructions for causing the apparatus to divide the drawing commands according to a feature thereof.

76. A computer-usable medium according to claim 75, wherein the drawing commands are divided into a character portion, a vector drawing portion and a bit map image portion.

77. A computer-usable medium storing computer-usable instructions for causing a program-controlled electronic filing apparatus to:

convert first data made with a first application program into drawing commands for printing, wherein the drawing commands can be processed with a second, other application program different from the first application program;

store the drawing commands as accumulated data corresponding to the first data; and extract a graph portion from the drawing commands stored in said storing instruction;

wherein said extracted graph portion is registered as key information for search.

78. A computer-usable medium according to claim 77, wherein the graph portion indicates presence or absence of a graph.

79. A computer-usable medium according to claim 77, the instructions further comprising instructions for causing the apparatus to divide the drawing commands according to a feature thereof.

80. A computer-usable medium according to claim 79, wherein the drawing commands are divided into a character portion, a vector drawing portion and a bit map image portion.

81. A computer-usable medium storing computer-usable instructions for causing a program-controlled electronic filing apparatus to:

convert first data made with a first application program into drawing commands for printing, wherein the drawing commands can be processed with a second, other application program different from the first application program;

store the drawing commands as accumulated data corresponding to the first data; and extract a bit map image portion from the drawing commands stored at said storing instruction;

wherein the extracted bit map image portion is registered as key information for search.

82. A computer-usable medium according to claim 81, wherein the bit map image portion indicates presence or absence of a bit map image.

83. A computer-usable medium according to claim 81, wherein the bit map image portion indicates the number of bit map images.

84. A computer-usable medium according to claim 81, the instructions further comprising instruction for causing the apparatus to divide the drawing commands according to a feature thereof.

85. A computer-usable medium according to claim 84, wherein the drawing commands are divided into a character portion, a vector drawing portion and a bit map image portion.

86. A computer-usable medium storing instructions for causing a program-controlled electronic apparatus, having a computer system structured to process file information of a text, a table and an image prepared and/or edited by plural application programs activatable by the computer system based on a predetermined operating system, to:

convert, by printer driver means, drawing information, transmitted from a first one of the application programs, into drawing commands for printing, wherein the drawing commands can be processed with a second, other one of the application programs different from the first application program;

store the drawing commands as accumulated data corresponding to the drawing information;

convert the drawing commands converted by the printer driver means and stored, into a common document file format which can be directly referenced by each of the plural application programs; and store a common file, according to the converted common document file format, in memory means.

87. A computer-usable medium according to claim 86, the instructions further comprising instructions for causing the apparatus to:

effect a search of the common file of the common document file format stored in the memory means, wherein the search can be executed in the computer system by a general-use driver for the application programs.

88. A computer-usable medium according to claim 86, wherein the printer driver means is adapted to analyze the drawing and to divide them into a character portion, a vector drawing portion, a bit map image portion and a halftone image portion and to generate compressed data from the divided portions.

89. A computer-usable medium according to claim 86, the instructions further comprising instructions for causing the apparatus to:

analyze, by optical character recognition means, the bit map image portion and the halftone image portion divided by the printer driver means, and recognize and extract character information added to the divided character portion.

* * * * *

UNITED STATES PATENT AND TRADEMARK OFFICE
CERTIFICATE OF CORRECTION

PATENT NO.   : 5,907,835
DATED        : May 25, 1999
INVENTOR(S)  : YOSHIKAZU YOKOMIZO, ET AL.

It is certified that error appears in the above-identified patent and that said Letters Patent is hereby corrected as shown below:

TITLE PAGE:

AT [56] REFERENCES CITED

U.S. PATENT DOCUMENTS

"5,255,104 10/1993 Ogawa" should read --5,255,104 10/1993 Kajigaya--; and
Insert: --5,471,319 11/1995 Ogawa--.

COLUMN 26

Line 57, "steps:" should read --steps of:--.

COLUMN 28

Line 65, "program," should read --program--.

COLUMN 30

Line 34, "instruction" should read --an instruction--.

Signed and Sealed this

Twenty-first Day of December, 1999

Attest:

Q. TODD DICKINSON

*Attesting Officer*     *Acting Commissioner of Patents and Trademarks*